United States Patent
Horling

(10) Patent No.: US 12,374,202 B2
(45) Date of Patent: *Jul. 29, 2025

(54) SYSTEMS, METHODS, AND DEVICES FOR ACTIVITY MONITORING VIA A HOME ASSISTANT

(71) Applicant: Google LLC, Mountain View, CA (US)

(72) Inventor: Bryan Horling, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,593

(22) Filed: Oct. 12, 2023

(65) Prior Publication Data
US 2024/0038037 A1  Feb. 1, 2024

Related U.S. Application Data

(63) Continuation of application No. 17/964,183, filed on Oct. 12, 2022, now Pat. No. 11,830,333, which is a continuation of application No. 15/930,122, filed on May 12, 2020, now Pat. No. 11,501,615, which is a continuation of application No. 16/536,212, filed on Aug. 8, 2019, now Pat. No. 10,650,647, which is a
(Continued)

(51) Int. Cl.
| | |
|---|---|
| G08B 13/16 | (2006.01) |
| G05B 15/02 | (2006.01) |
| G08B 15/00 | (2006.01) |
| G08B 25/00 | (2006.01) |
| H05B 47/115 | (2020.01) |
| H05B 47/12 | (2020.01) |
| H05B 47/125 | (2020.01) |
| H05B 47/19 | (2020.01) |

(52) U.S. Cl.
CPC ......... *G08B 13/1672* (2013.01); *G05B 15/02* (2013.01); *G08B 15/002* (2013.01); *G08B 25/008* (2013.01); *H05B 47/115* (2020.01); *H05B 47/12* (2020.01); *H05B 47/125* (2020.01); *H05B 47/19* (2020.01); *G05B 2219/2642* (2013.01)

(58) Field of Classification Search
CPC ............. G08B 13/1672; G08B 15/002; G08B 25/008; G05B 15/02; G05B 2219/2642; H05B 37/0227; H05B 37/0236; H05B 37/0272
See application file for complete search history.

(56) References Cited

U.S. PATENT DOCUMENTS

| | | | | | |
|---|---|---|---|---|---|
| 4,212,007 A | * | 7/1980 | Reyes | ................... | G08B 15/002 40/414 |
| 5,786,760 A | * | 7/1998 | Suzuki | ................. | G08B 15/002 340/555 |

(Continued)

*Primary Examiner* — Nay Tun
(74) *Attorney, Agent, or Firm* — Kilpatrick Townsend & Stockton LLP

(57) ABSTRACT

The various implementations described herein include methods, devices, and systems for monitoring activity in a home environment. In one aspect, a method performed at a voice-assistant device includes: detecting a sound; obtaining a determination as to whether the sound meets one or more monitoring criteria; and in accordance with a determination that the sound meets the one or more monitoring criteria, generating a notification.

20 Claims, 16 Drawing Sheets

Related U.S. Application Data continuation of application No. 15/895,910, filed on Feb. 13, 2018, now Pat. No. 10,380,852.

(60) Provisional application No. 62/505,761, filed on May 12, 2017.

(56) References Cited

U.S. PATENT DOCUMENTS

| | | | | |
|---|---|---|---|---|
| 6,611,206 | B2* | 8/2003 | Eshelman | G08B 21/0453 340/541 |
| 6,795,808 | B1* | 9/2004 | Strubbe | H04N 21/466 704/E15.04 |
| 6,941,269 | B1* | 9/2005 | Cohen | G10L 13/00 704/275 |
| 9,368,095 | B2* | 6/2016 | Oh | G10H 5/005 |
| 9,576,574 | B2* | 2/2017 | van Os | G10L 15/22 |
| 10,120,354 | B1* | 11/2018 | Rolston | H04L 12/2816 |
| 10,142,745 | B2* | 11/2018 | Petersen | H04R 25/552 |
| 10,380,852 | B2* | 8/2019 | Horling | G08B 13/1672 |
| 2002/0070856 | A1* | 6/2002 | Wolfe | G08B 21/0269 340/539.11 |
| 2002/0171551 | A1* | 11/2002 | Eshelman | G08B 21/0423 340/573.1 |
| 2005/0134450 | A1* | 6/2005 | Kovach | G08B 25/00 340/506 |
| 2010/0128123 | A1* | 5/2010 | DiPoala | G08B 13/19619 340/541 |
| 2011/0230114 | A1* | 9/2011 | Du Preez | A63H 3/28 446/268 |
| 2012/0293329 | A1* | 11/2012 | Cunningham | G08B 13/1672 340/566 |
| 2014/0222436 | A1* | 8/2014 | Binder | G10L 21/16 704/275 |
| 2014/0266669 | A1* | 9/2014 | Fadell | H04W 4/80 340/501 |
| 2014/0313032 | A1* | 10/2014 | Sager | G08B 25/008 340/539.17 |
| 2014/0368643 | A1* | 12/2014 | Siegel | G08B 13/19695 348/143 |
| 2015/0143978 | A1* | 5/2015 | Oh | G10H 5/005 84/692 |
| 2015/0145993 | A1* | 5/2015 | Scalisi | H04M 11/025 348/143 |
| 2015/0162006 | A1* | 6/2015 | Kummer | H04N 21/41265 704/275 |
| 2016/0148487 | A1* | 5/2016 | Thomas | G05B 15/02 340/686.6 |
| 2016/0163168 | A1* | 6/2016 | Brav | G08B 29/188 381/56 |
| 2016/0171980 | A1* | 6/2016 | Liddell | G10L 15/22 704/275 |
| 2016/0252901 | A1* | 9/2016 | Harary | E06B 9/24 |
| 2016/0282639 | A1* | 9/2016 | von und zu Liechtenstein | G02F 1/13725 |
| 2016/0295089 | A1* | 10/2016 | Farahani | B60R 11/04 |
| 2017/0223314 | A1* | 8/2017 | Collings, III | H04N 23/50 |
| 2018/0113577 | A1* | 4/2018 | Burns | G06F 16/739 |
| 2018/0146307 | A1* | 5/2018 | Petersen | H04R 25/552 |
| 2018/0301151 | A1* | 10/2018 | Mont-Reynaud | G10L 15/22 |
| 2018/0330589 | A1* | 11/2018 | Horling | G05B 15/02 |
| 2019/0216228 | A1* | 7/2019 | Bertinato | G05B 15/02 |
| 2020/0410831 | A1* | 12/2020 | Horling | H05B 47/125 |

\* cited by examiner

Motion Sketches

| Breathing / Pulsing | Flickering | Blinking | Swiping | Rotating | Rotating |
|---|---|---|---|---|---|
|  |  |  |  |  |  |
| (1) | (3) | (5) | (6) | (7) | (9) |
|  |  |  |  |  |  |
| (2) | (4) | | | (8) | (10) |

SYSTEMS, METHODS, AND DEVICES FOR ACTIVITY MONITORING VIA A HOME ASSISTANT

RELATED APPLICATIONS

This application is a continuation of U.S. patent application Ser. No. 17/964,183, filed Oct. 12, 2022, which is a continuation of U.S. patent application Ser. No. 15/930,122, filed May 12, 2020, issued as U.S. Pat. No. 11,501,615 on Nov. 15, 2022, which is a continuation of U.S. patent application Ser. No. 16/536,212, filed Aug. 8, 2019, issued as U.S. Pat. No. 10,650,647 on May 12, 2020, which is a continuation of U.S. patent application Ser. No. 15/895,910, filed Feb. 13, 2018, issued as U.S. Pat. No. 10,380,852 on Aug. 13, 2019, which claims priority to U.S. Provisional Patent Application No. 62/505,761, filed May 12, 2017, each of which is hereby incorporated by reference in its entirety.

TECHNICAL FIELD

This relates generally to activity monitoring, including but not limited to methods and systems for monitoring activity via a home assistant device.

BACKGROUND

Electronic devices integrated with microphones have been widely used to collect voice inputs from users and implement voice-activated functions according to the voice inputs. For example, many state-of-the-art devices include a voice assistant feature (e.g., Siri, Google Assistant) that is configured to use voice inputs to initiate a phone call, conduct a restaurant search, and complete many other tasks.

In addition, there is a need for home monitoring devices that can alert a resident to unexpected or unauthorized activity in or around the home. Thus, it is desirable for a voice assistant device to be able to monitor activity within a premises and report anomalies to residents and/or authorities.

SUMMARY

Accordingly, there is a need for methods, devices, and systems for monitoring activity on a premises via one or more voice assistant device(s). Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to monitor activity on a premises.

With the voice assistants there is an opportunity to help provide users peace of mind by monitoring their home environment, and alerting the user if something unexpected is detected. When the assistant is in a "home monitoring" mode, the microphone and other sensors are enabled, and audio or other useful data is analyzed (e.g., analyzed at a server system). If an anomaly is detected, the user or authorities can be notified. The user may then choose to review the unexpected event, and optionally live stream data to and/or from the assistant device.

For example, a family is leaving for vacation for the weekend. On their way out the door, the mother asks their voice assistant device: "We'll be away until Sunday night, can you keep an eye on things?" The voice assistant responds: "Ok Laura, I'll notify you if I hear anything out of the ordinary."

For the first day, a variety of normal audible events occur without incident-cars go by, birds sing and it rains a bit. These are noticed by assistant, but are recognized as regular background noise. On Sunday morning, however, a back door is forced open and an intruder enters the house. Laura is quickly notified, including a recording of the event that she is able to review. After listening to the live stream, she contacts the authorities, who save the day.

In some implementations, users actively enable home monitoring mode, optionally specifying a start and end time. In some implementations, monitoring is disabled similarly (e.g., "Hi assistant, we're back!"), with a confirmation and/or notice appearing on the user's phone or from the assistant device.

In some implementations, the assistant learns what is normal background noise for the particular house. For example, with one or more training sessions where the microphone is left open for some length of time to collect the necessary data, the voice assistant comes to recognize routine sounds. In aggregate, this data can also provide a suitable baseline background model for the overall population.

In some implementations, when something unexpected happens, the user is informed in a variety of ways (e.g., SMS, email, chat, and/or a phone call). In some implementations, the assistant also reacts locally, e.g., by turning on the lights, simulating a barking dog, and/or contacting a neighbor.

In some implementations, once alerted of an unexpected event, users can receive real-time information from the voice assistant to better understand the situation. For example, a live audio stream can be sent to the user device. In some implementations, the audio stream is accessed directly without a notification as well.

In some implementations, in addition to monitoring the home, the assistant also mimics regular activity within the home. For example, based on a learned or specified schedule, lights, televisions, and/or audio devices in the home are turned on and off to make it appear that someone is home.

In some implementations, in addition to explicit management of the monitoring feature by the user, the assistant is configured to perform some monitoring automatically. For example, it might automatically enable and/or disable the monitoring mode based on a learned schedule, or when the user's phone is away from home.

In some implementations, a user explicitly asks the voice assistant to watch the house for him/her. When enabled, the assistant listens for and reacts to loud and/or unexpected noises, e.g., by pretending to be a dog or saying something ("Who's there?"). In some implementations, when the user turns the feature off, the assistant gives a short summary of what was heard.

In some implementations, sounds are saved into audio history, so the transcript of what happened is accessible to the user via a link or search option. In some implementations, the voice assistant relays the recordings to the user (e.g., "Do you want to hear them now?").

In some implementations, the simulated responses (e.g., barking) are suppressed when the user is known to be at home, e.g., as determined by their device location. In some implementations, this signal is used to switch from barking to "Are you home?", if a noise is detected after the user has or is about to arrive home. In some implementations, the guard feature is turned off via an "I'm home" or "stop" command from an authorized user.

In one aspect, some implementations include a voice assistant device capable of operating in an assistant mode and a monitoring mode. While operating in the assistant mode, the device receives an occupant voice command to operate in the monitoring mode. In response to the occupant command, the device transitions from operating in the assistant mode to operating in the monitoring mode. The device obtains one or more monitoring criteria and, while operating in the monitoring mode, detecting a sound. The device obtains a determination as to whether the sound meets the one or more monitoring criteria. In accordance with a determination that the sound meets the one or more monitoring criteria, the device: (1) obtains a classification of the sound; and (2) based on sound having a first sound classification, emits a first simulated occupant response of a plurality of simulated occupant responses via the one or more speakers.

In another aspect, some implementations include a method for monitoring activity in a home environment, including: (1) while operating in the assistant mode, receiving an occupant voice command to operate in the monitoring mode; (2) in response to the occupant command, transitioning from operating in the assistant mode to operating in the monitoring mode; (3) obtaining one or more monitoring criteria; (4) while operating in the monitoring mode, detecting a sound; (5) obtaining a determination as to whether the sound meets the one or more monitoring criteria; and (6) in accordance with a determination that the sound meets the one or more monitoring criteria: (a) obtaining a classification of the sound; and (b) based on sound having a first sound classification, emitting a first simulated occupant response of a plurality of simulated occupant responses via the one or more speakers.

In yet another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Thus, devices, storage mediums, and computing systems are provided with methods for monitoring home activity, thereby increasing the effectiveness, efficiency, and user satisfaction with such systems. Such methods may complement or replace conventional methods for monitoring home activity.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Voice-activated devices, such as voice assistants and home assistants, are configured to listen to their environs and respond to user requests. These same devices can be further configured to monitor the environs when the user is away, thus providing additional security and peace of mind to the user. The voice-activated devices can listen to and classify sounds to determine whether an event of potential interest to the users is occurring. The devices can then alert the user, alert the authorities, and/or respond to the event (e.g., by asking who is there, or simulating a dog barking). In addition, the alerts can include a recording of the event for playback by the user, an option to listen to the current sounds in the home, and/or options for how the user wishes the device to respond.

In a smart home environment, the voice-activated devices can leverage the sensors and outputs of interconnected device. For example, the voice-activated device can use data from other smart devices to better classify a detected event, to determine if the home environment is occupied, and/or to output event responses via another smart device (e.g., simulate a dog barking at a smart camera having a speaker and installed in the backyard).

Figure 1:
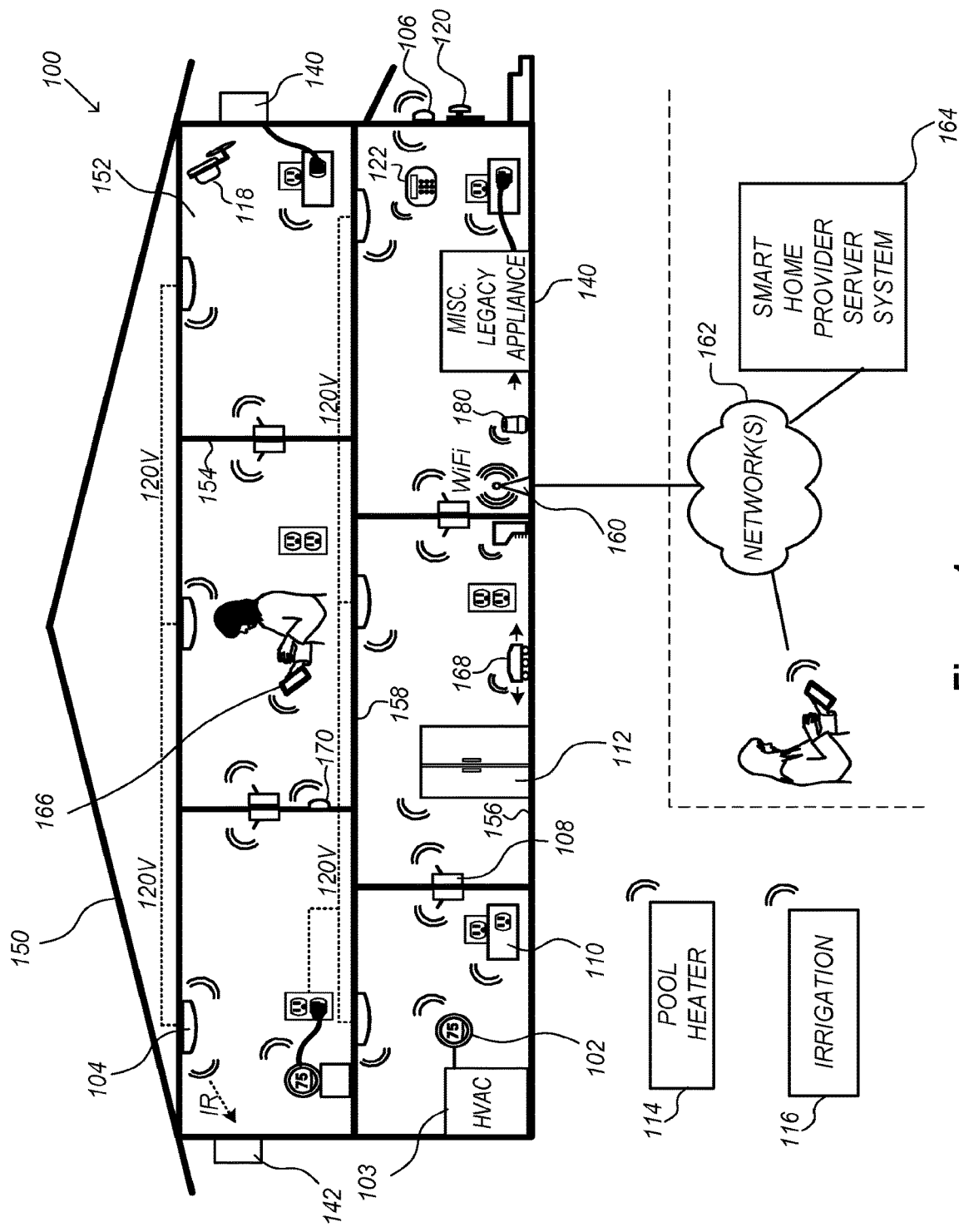
FIG. 1 is an example operating environment that includes a plurality of smart devices in accordance with some implementations.

FIG. 1 is an example operating environment 100 in accordance with some implementations. The operating environment 100 includes a structure 150 (e.g., a house, office building, garage, or mobile home) with various integrated devices. It will be appreciated that devices may also be integrated into an operating environment 100 that does not include an entire structure 150, such as an apartment, condominium, or office space. Further, the operating environment 100 may control and/or be coupled to devices outside of the actual structure 150. Indeed, several devices in the operating environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, affixed to, integrated with and/or supported by a wall 154, floor 156 or ceiling 158. In some implementations, electronic tags are affixed to a wall 154, floor 156, ceiling 158, window, or door.

In some implementations, the integrated devices of the operating environment 100 include intelligent, multi-sensing, network-connected devices that integrate seamlessly with each other in a smart home network (e.g., local network 204, FIG. 2) and/or with a central server or a cloud-computing system to provide a variety of useful smart home functions. The operating environment 100 optionally includes one or more voice-activated assistant devices 180 (also sometimes called voice assistants or home assistants), one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (e.g., "smart doorbells 106" and "smart door locks 120"), and one or more intelligent, multi-sensing, network-connected alarm systems 122 (hereinafter referred to as "smart alarm systems 122").

In some implementations, the voice-activated assistant devices 180 respond to verbal user requests (e.g., when in an assistant mode) and respond to audio events detected in the operating environment 100 (e.g., when in a monitoring mode).

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the operating environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the operating environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The operating environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the operating environment 100 includes one or more network-connected cameras 118 that are configured to provide video monitoring and security in the operating environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). The cameras 118 optionally include one or more sensors (e.g., IR sensors, radar systems, motion detectors), input devices (e.g., microphone for capturing audio), and output devices (e.g., speaker for outputting audio).

The operating environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the operating environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The operating environment 100 may also include communication with devices outside of the physical home but within a proximate geographical range of the home. For example, the operating environment 100 may include a pool heater monitor 114 that communicates a current pool temperature to other devices within the operating environment 100 and/or receives commands for controlling the pool temperature. Similarly, the operating environment 100 may include an irrigation monitor 116 that communicates information regarding irrigation systems within the operating environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the operating environment 100 using a network-connected computer or portable electronic device 166. In some examples, some or all of the occupants (e.g., individuals who live in the home) may register their device 166 with the operating environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the operating environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, 180, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the operating environment 100 of FIG. 1 includes a hub device that is communicatively coupled to the network(s) 162 directly or via the network interface 160. The hub device is further communicatively coupled to one or more of the above intelligent, multi-sensing, network-connected devices (e.g., smart devices of the operating environment 100). Each of these smart devices optionally communicates with the hub device using one or more radio communication networks available at least in the operating environment 100 (e.g., ZigBee, Z-Wave, Insteon, Bluetooth, Wi-Fi and other radio communication networks). In some implementations, the hub device and devices coupled with/to the hub device can be controlled and/or interacted with via an application (sometimes called a smart home application) running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types— even across different communication protocols, and is configured to streamline adding of new devices and commissioning of the hub device. In some implementations, hub device further comprises a local storage device for storing data related to, or output by, smart devices of operating environment 100. In some implementations, the data includes one or more of: video data output by a camera device, metadata output by a smart device, settings information for a smart device, usage logs for a smart device, and the like.

In some implementations, operating environment 100 includes a local storage device for storing data related to, or output by, smart devices of operating environment 100. In some implementations, the data includes one or more of: video data output by a camera device (e.g., camera 118), metadata output by a smart device, settings information for a smart device, usage logs for a smart device, and the like. In some implementations, the local storage device is communicatively coupled to one or more smart devices via a smart home network (e.g., smart home network 202, FIG. 2). In some implementations, the local storage device is selectively coupled to one or more smart devices via a wired and/or wireless communication network. In some implementations, the local storage device is used to store video data when external network conditions are poor. For example, the local storage device is used when an encoding bitrate of camera 118 exceeds the available bandwidth of the external network (e.g., network(s) 162). In some implementations, the local storage device temporarily stores video data from one or more cameras (e.g., camera 118) prior to transferring the video data to a server system. In some implementations, the local storage device is a component of a camera device. In some implementations, each camera device includes a local storage.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings or other structures, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Figure 2:
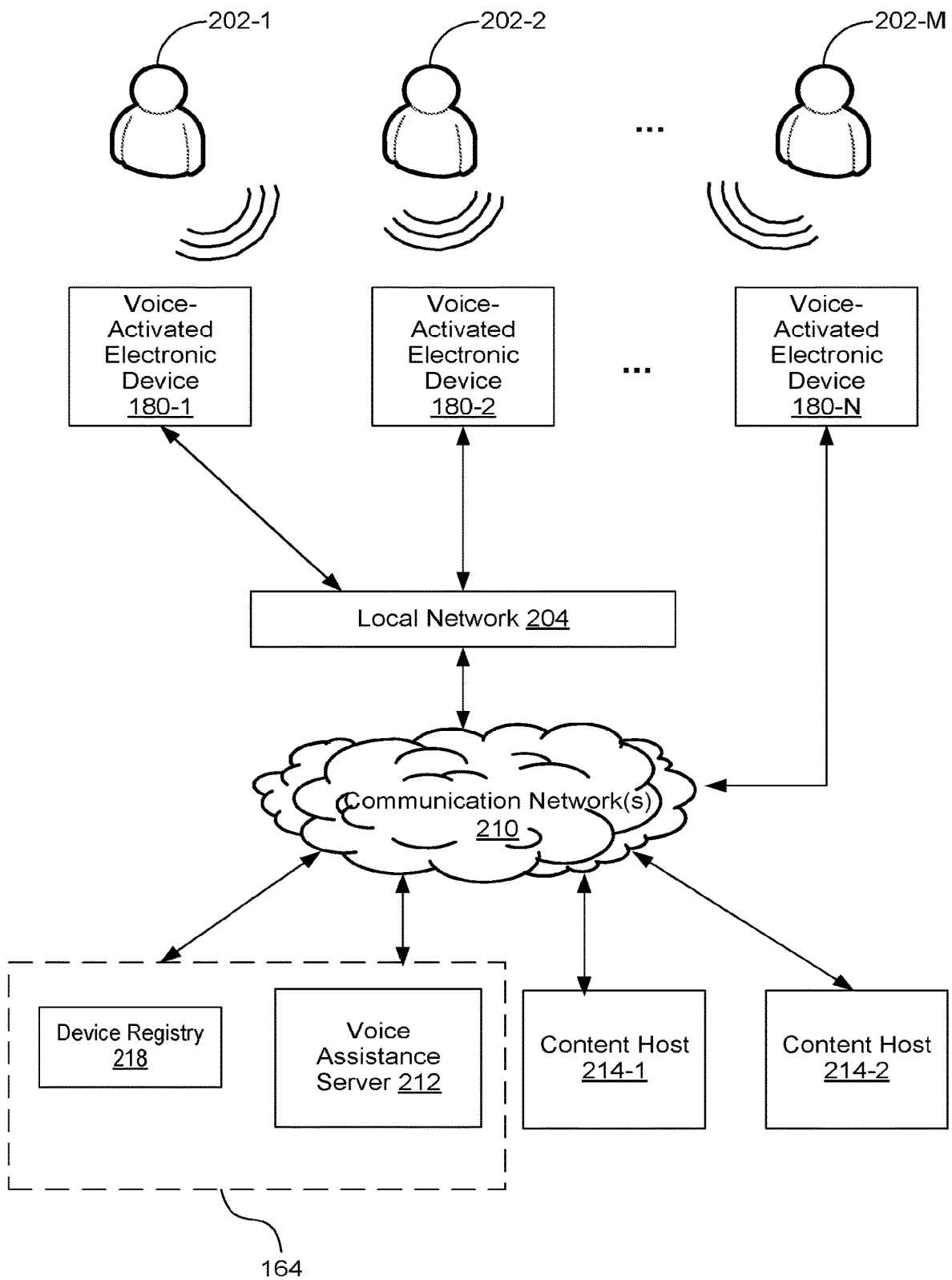
FIG. 2 is a block diagram illustrating another example operating environment that includes a plurality of voice-activated devices and a server system in accordance with some implementations.

FIG. 2 is a block diagram illustrating an example operating environment that includes a plurality of voice-activated devices and a server system in accordance with some implementations. The operating environment includes one or more voice-activated electronic devices 180 (e.g., electronic devices 180-1 thru 180-N). The one or more voice-activated electronic devices 180 are optionally located in one or more locations. For example, the voice-activated devices 180 could be all in a single room or space of a structure, such as structure 150; spread out throughout multiple spaces within the structure; or spread out throughout multiple structures (e.g., one in a house and one in the user's car). The environment optionally includes one or more devices (e.g., media devices and/or smart home devices) (not shown) communicatively coupled to the voice-activated electronic devices 180.

In accordance with some implementations, the voice-activated devices 180 are communicatively coupled, through communication networks 210, to a voice assistance server 212 of a smart home server system 164. In some implementations, one or more of the voice-activated devices 180 are communicatively coupled to a local network 204, which is communicatively coupled to the communication networks 210 (e.g., voice-activated devices 180 1 and 180-2 in FIG. 2). In some implementations, the local network 204 is a local area network implemented at a network interface (e.g., a router). In some implementations, the voice-activated devices 180 that are communicatively coupled to the local network 204 also communicate with one another through the local network 204. In some implementations, the voice-activated devices 180 are communicatively coupled to one another (e.g., without going through the local network 204 or the communication network(s) 210).

Optionally, one or more of the voice-activated devices 180 are communicatively coupled to the communication networks 210 and are not on the local network 204 (e.g., voice-activated device 180-N). For example, these voice-activated devices 180 are not on the Wi-Fi network corresponding to the local network 204 but are connected to the communication networks 210 through a cellular connection. In some implementations, communication between voice-activated devices 180 that are on the local network 204 and voice-activated devices 180 that are not on the local network 204 is performed through the voice assistance server 212. In some implementations, the voice-activated devices 180 are registered in a device registry 218 and thus known to the voice assistance server 212.

In some implementations, the operating environment also includes one or more content hosts 214. In some implementations, a content host 214 is a remote content source from which content is streamed or otherwise obtained in accordance with a user voice request. In some implementations, a content host 214 is an information source from which the voice assistance server 212 retrieves information in accordance with a user voice request.

In some implementations, a voice-activated device 180 is associated with multiple users having respective user accounts in the user domain. In some implementations, any of these users, as well as users not associated with the device, may make voice inputs to the voice-activated device 180. In some implementations, the voice-activated device 180 receives these voice inputs from these users 202-1 thru 202-M (e.g., including associated and non-associated users), and the voice-activated device 180 and/or the voice assistance server 212 proceeds to identify, for a voice input, the user making the voice input. With the user identification, a response to that voice input may be personalized to the identified user.

In some implementations, the environment includes multiple voice-activated devices 180 (e.g., devices 180-1 thru 180-N). The voice-activated devices 180 are located throughout the environment (e.g., all within a room or space in a structure, spread throughout the structure, or some within the structure and some without). When a user 202 makes a voice input, each of the voice-activated devices 180 either receives the input or does not receive the input (e.g., if the device was too far away from the user). The devices that receive the input receive the input at varying degrees of quality; the quality of the sample of the voice input at a device is based on multiple factors, including but not limited to distance of the user from the device and the noise around the device. In some implementations, the multiple devices 180 negotiate a leader amongst themselves to respond to the user and to receive further voice input from the user 102 based on the quality of the samples of the voice inputs.

In some implementations, a voice-activated device 180 determines a level of noise around the device and determines whether the determined noise level is sufficiently high to interfere with recognition of the hotword in voice inputs, and thus interfere with awakening of the device by voice, or with recognition of voice requests. In some implementations, if the noise level is determined to be sufficiently high to be interfering, the voice-activated device 180 indicates to the user that the noise level is interfering and gives the user a hint that the user should use another way to wake up the voice-activated device 180 (e.g., activate a button). In some implementations, the indication of the interfering noise level and the hint to use another way to wake up the device are done via the same presentation (e.g., illuminating the wake-up button).

In some implementations, one or more media devices are disposed in the operating environment to provide to one or more occupants media content, news and/or other information. In some implementations, the content provided by the media devices is stored at a local content source, streamed from a remote content source (e.g., content host(s) 214), or generated locally (e.g., through a local text to voice processor that reads a customized news briefing, emails, texts, a local weather report, etc. to one or more occupants of the operating environment). In some implementations, the media devices include media output devices that directly output the media content to an audience (e.g., one or more users), and cast devices that are networked to stream media content to the media output devices. Examples of the media output devices include, but are not limited to television (TV) display devices and music players. Examples of the cast devices include, but are not limited to, set-top boxes (STBs), DVD players, TV boxes, and media streaming devices, such as Google's Chromecast media streaming device.

In some implementations, the media devices include one or more voice-activated electronic devices 180 that receive, process, and respond to voice commands of occupants. In some implementations, the voice-activated electronic devices 180 respond to voice commands by: generating and providing a spoken response to a voice command (e.g., speaking the current time in response to the question, "what time is it?"); streaming media content requested by a user (e.g., "play a Beach Boys song"); reading a news story or a daily news briefing prepared for the user; playing a media item stored on the personal assistant device or on the local network; changing a state or operating one or more other connected devices within the operating environment (e.g., turning lights, appliances or media devices on/off, locking/unlocking a lock, opening windows, etc.); or issuing a corresponding request to a server via a network 210.

In some implementations, the one or more voice-activated devices 180 are disposed in the operating environment to collect audio inputs for initiating various functions, including media play functions of the media devices. In some implementations, these voice-activated electronic devices 180 (e.g., devices 180-1 thru 180-N) are disposed in proximity to a media device, for example, in the same room with the cast devices and the media output devices. Alternatively, in some implementations, a voice-activated electronic device 180 is disposed in a room having one or more smart home devices but not any media device. Alternatively, in some implementations, a voice-activated electronic device 180 is disposed in a location having no networked electronic device. Further, in some implementations, a room or space in the structure has multiple voice-activated devices 180.

In some implementations, the voice-activated device 180 includes at least one or more microphones, a speaker, a processor and memory storing at least one program for execution by the processor. The speaker is configured to allow the voice-activated device 180 to deliver voice messages and other audio (e.g., audible tones or simulated animal noises) to a location where the voice-activated device 180 is located in the operating environment. For example, broadcasting music, reporting a state of audio input processing, and/or having a conversation with or giving instructions to a user of the voice-activated device 180. In some implementations, visual signals are used to provide feedback to the user of the voice-activated device 180 concerning the state of audio input processing. For example, when the voice-activated device 180 is a mobile device (e.g., a mobile phone or a tablet computer), its display screen is optionally configured to display a notification concerning the state of audio input processing.

In some implementations, the voice-activated device 180 is a voice interface device that is network-connected to provide voice recognition functions with the aid of a voice assistance server 212 and/or optionally a cloud cast service server (not shown). For example, the voice-activated device 180 includes a smart speaker that provides music to a user and allows eyes-free and hands-free access to a voice assistant service (e.g., Google Assistant). Optionally, the voice-activated device 180 is a desktop or laptop computer, a tablet, a mobile phone that includes a microphone, a cast device that includes a microphone and optionally a speaker, an audio system (e.g., a stereo system, a speaker system, a portable speaker) that includes a microphone and a speaker, a television that includes a microphone and a speaker, or a user interface system in an automobile that includes a microphone and a speaker and optionally a display. Optionally, the voice-activated device 180 is a simple and low cost voice interface device. Generally, the voice-activated device 180 may be any device that is capable of network connection and that includes a microphone, a speaker, and programs, modules, and data for implementing a voice assistant service. In accordance with some implementations, given simplicity and low cost of the voice-activated device 180, the voice-activated device 180 includes an array of light emitting diodes (LEDs) rather than a full display screen, and displays a visual pattern on the LEDs to relay information to users (e.g., to indicate the state of audio input processing). In some implementations, the LEDs are full color LEDs, and the colors of the LEDs are employed as a part of the visual pattern to be displayed on the LEDs. Multiple examples of using LEDs to display visual patterns in order to convey information or device status are described in the U.S. Provisional Patent Application No. 62/336,566. In some implementations, visual patterns indicating the state of voice processing operations are displayed using characteristic images shown on conventional displays associated with electronic devices that are performing the voice processing operations.

In some implementations, LEDs or other visual displays are used to convey a collective voice processing state of multiple participating electronic devices. For example, in an operating environment where there are multiple voice processing or voice interface devices (e.g., multiple voice-activated devices 180), groups of color LEDs (e.g., LEDs 504 as shown in Figure associated with respective electronic devices can be used to convey which of the electronic devices is listening to a user, and which of the listening devices is the leader (where the "leader" device generally takes the lead in responding to a spoken request issued by the user).

More generally, an "LED Design Language" may be employed for indicating visually, using a collection of LEDs, a variety of voice processing states of an electronic device, such as a "hotword detection and listening state," a "thinking or working mode," a "responding or speaking mode," and an "anomaly detection mode." In some implementations, unique states of voice processing operations described herein are represented using a group of LEDs in accordance with one or more aspects of the "LED Design Language" of the '566 application. These visual indicators can also be combined with one or more audible indicators generated by electronic devices that are performing voice processing operations. The resulting audio and/or visual indicators enable users in a voice-interactive environment to understand the state of various voice processing electronic devices in the environment and to effectively interact with those devices in a natural, intuitive manner.

When voice inputs from the voice-activated device 180 are used to control the media output devices via the cast devices, the voice-activated device 180 effectively enables a new level of control of cast-enabled media devices. In a specific example, the voice-activated device 180 includes a casual enjoyment speaker with far-field voice access and functions as a voice interface device for a voice assistant service. The voice-activated device 180 could be disposed in any area in the operating environment 100. In accordance with some implementations, when multiple electronic devices 180 are distributed in multiple rooms, they become cast audio receivers that are synchronized to provide voice inputs from all these rooms.

Specifically, in some implementations, the voice-activated device 180 includes a Wi-Fi speaker with a microphone that is connected to a voice-activated voice assistant service (e.g., Google Assistant). A user can issue a media play request via the microphone of electronic device 180, and ask the voice assistant service to play media content on the voice-activated device 180 itself or on another coupled media output device. For example, the user can issue a media play request by saying to the Wi-Fi speaker "OK Google, play cat videos on my Living room TV." The voice assistant service then fulfils the media play request by playing the requested media content on the requested device using a default or designated media application.

In some implementations, a user can issue a voice request, via the microphone of the voice-activated device 180, concerning media content that has already been played or is being played on a display device (e.g., the user can ask for information about the media content, buy the media content through an online store, or compose and publish a social post about the media content).

In some implementations, a user may want to take a current media session with them as they move through the house and can request such a service from one or more of the voice-activated devices 180. In some implementations, this requires the voice assistant service to transfer the current media session from a first cast device to a second cast device that is not directly connected to the first cast device and/or has no knowledge of the existence of the first cast device. Subsequent to the media content transfer, a second output device coupled to the second cast device continues to play the media content previously a first output device coupled to the first cast device from the exact point within a music track or a video clip where play of the media content was forgone on the first output device. In some implementations, the voice-activated device 180 that receives the request to transfer the media session can satisfy the request. In some implementations, the voice-activated device 180 that receives the request to transfer the media session relays the request to another device or system (e.g., a hub device, voice assistance server 212) for handling.

Further, in some implementations, a user may issue, via the microphone of the voice-activated device 180, a request for information or for performance of an action or operation. The information requested may be personal (e.g., the user's emails, the user's calendar events, the user's flight information, etc.), non-personal (e.g., sports scores, news stories, etc.) or somewhere in between (e.g., scores for teams or sports preferred by the user, news stories from the user's preferred sources, etc.). The requested information or action/operation may involve access to personal information (e.g., purchasing a digital media item with payment information provided by the user, purchasing a physical good). The voice-activated device 180 responds to the request with voice message responses to the user, where the response optionally include, for example, requests for authentication, requests for additional information to fulfill the request, confirmation that the request has been fulfilled, notice that the request cannot be fulfilled, and so forth.

In some implementations, in addition to the voice-activated electronic devices 180 and the media devices (e.g., the output devices and the cast devices), the operating environment 100 also includes one or more smart home devices. The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the operating environment 100 as a cast device and/or an output device, and therefore, is located in proximity to or with a known distance with respect to the cast device and the output device. In some implementations, any one of the smart home devices is outfitted with microphones and one or more voice processing capabilities as described herein so as to in whole or in part respond to voice requests from an occupant or user.

In some implementations, each of the cast devices and the voice-activated electronic devices 180 is capable of data communications and information sharing with other cast devices, voice-activated electronic devices 180, smart home devices, a central server or cloud-computing system, and/or other devices (e.g., the client device) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Through the communication networks (e.g., the Internet) 210, the cast devices, the voice-activated devices 180, and the smart home devices may communicate with the server system 164 (also sometimes called a central server system and/or a cloud-computing system). In some implementations, the server system 164 is associated with a manufacturer, support entity, or service provider associated with the cast devices and/or the media content displayed to the user. In accordance with some implementations, the server system 164 includes the voice assistance server 212 that processes audio inputs collected by voice-activated electronic devices 180, one or more content hosts 214 that provide the displayed media content, a cloud cast service server creating a virtual user domain based on distributed device terminals, and the device registry 218 that keeps a record of the distributed device terminals in the virtual user environment. Examples of the distributed device terminals include, but are not limited to the cast devices, the media output devices, the voice-activated devices 180 and the smart home devices. In some implementations, these distributed device terminals are linked to a user account (e.g., a Google user account) in the virtual user domain. It should be appreciated that processing of audio inputs collected by electronic devices 180 can be performed locally at a voice-activated device 180, at a voice assistance server 212, at another smart home device (e.g., a hub device) or at some combination of all or subset of the above.

It will be appreciated that in some implementations the voice-activated device(s) 180 also function in an environment without smart home devices. For example, a voice-activated device 180 can, even in the absence of smart home devices, respond to user requests for information or performance of an action, and/or to initiate or control various media play functions. A voice-activated device 180 can also function in a wide range of environments, including, without limitation, a vehicle, a ship, a business, or a manufacturing environment.

In some implementations, a voice-activated device 180 is "awakened" (e.g., while in an assistant mode) by a voice input that includes a hotword (also sometimes called a "wake For example, the voice-activated device 180 is awakened to activate an interface for the voice assistant service on the voice-activated device 180 and/or to put the voice-activated device 180 into a state where the voice-activated device 180 is ready to receive and process voice requests.

In some implementations, the voice-activated device 180 requires awakening if the voice-activated device 180 has been idle with respect to receipt of voice inputs for at least a predefined amount of time (e.g., 1 minute, 5 minutes, or 10 minutes). For example, the predefined amount of time corresponds to an amount of idle time allowed before a voice interface session or conversation times out. In some implementations, the hotword is a term or phrase. In some implementations, the hotword is a predefined default or is customized by a user (e.g., a user may set a nickname for a particular electronic device 180 as the device's hotword). In some implementations, there are multiple hotwords that can awaken a voice-activated device 180. In accordance with some implementations, a user speaks the hotword, waits for an acknowledgement response from the voice-activated device 180 (e.g., the voice-activated device 180 outputs a greeting), and then makes a first voice request. Alternatively, the user may combine the hotword and the first voice request in one voice input (e.g., the voice input includes the hotword followed by the voice request).

In some implementations, the voice inputs spoken by the user to a voice-activated device 180 may generally be freeform or natural language speech. That is, the voice input need not be strictly limited to a predefined set of words and phrases within a predefined syntax, with possibly certain exceptions (e.g., user needs to speak the hotword first to awaken the device).

In some implementations, a voice-activated device 180 includes one or more additional ways or affordances to wake up the device besides speaking the hotword to the voice-activated device 180. The additional ways or affordances may include, for example, activating a predefined button or touch sensor (e.g., a touch sense array) on the voice-activated device 180.

In some implementations, a voice-activated electronic device 180 interacts with a cast device, a client device, or a server system of the operating environment 100 in accordance with some implementations. In accordance with some implementations, the voice-activated electronic device 180 is configured to receive audio inputs from an environment in proximity to the voice-activated electronic device 180 (e.g., within audible range of the microphone(s) of the Optionally, the voice-activated device 180 stores the audio inputs and/or at least partially processes the audio inputs locally. Optionally, the voice-activated device 180 transmits the received audio inputs and/or the partially processed audio inputs to the voice assistance server 212 via the communication networks 210 for processing.

In some implementations, the cast device(s) are configured to obtain media content or Internet content from the one or more content hosts 214 for display on an output device coupled to the cast device. In some implementations, the cast device and the voice-activated electronic device 180 are linked to each other in a user domain. In some implementations, the cast device(s) and the voice-activated device 180 are each associated with a same user account in the user domain. In some implementations, information for the cast device and/or information for the voice-activated device 180 are stored in the device registry 218 in association with the user account. In some implementations, a first device registry is used for cast device(s) and a second registry is used for voice-activated electronic device(s) 180. In some implementations, a cloud cast service server manages the cast devices registry and the voice assistance server 212 manages the voice-activated electronic devices registry. In some implementations, the cast devices registry references devices in the voice-activated electronic devices registry that are associated in the user domain, and vice versa.

In some implementations, one or more of the voice-activated devices 180 (and optionally one or more cast devices) are commissioned to the voice assistant service via a client device 166. In some implementations, the voice-activated electronic device 180 (and/or the cast device) does not include a display screen, and relies on the client device to provide a user interface during a commissioning process. Specifically, in accordance with some implementations, the client device 166 is installed with an application that enables a user interface to facilitate commissioning of a new voice-activated electronic device 180 disposed in proximity to the client device.

For example, a user may send a request on the user interface of the client device 166 to initiate a commissioning process for the new electronic device 180 that needs to be commissioned. After receiving the commissioning request, the client device establishes a short range communication link with the new electronic device 180 that needs to be commissioned. Optionally, the short range communication link is established based near field communication (NFC), Bluetooth, Bluetooth Low Energy (BLE) and the like. The client device then conveys wireless configuration data associated with a wireless local area network (WLAN) (e.g., local network 104) to the new electronic device 180. In some implementations, the wireless configuration data includes one or more of: a WLAN security code, an SSID, an Internet protocol (IP) address, proxy configuration information, and gateway configuration information. After receiving the wireless configuration data via the short range communication link, the new electronic device 180 decodes and recovers the wireless configuration data, and joins the WLAN based on the wireless configuration data.

In some implementations, additional user domain information is entered via a user interface displayed on the client device, and is used to link the new electronic device 180 to an account in a user domain. In some implementations, the additional user domain information is conveyed to the new electronic device 180 in conjunction with the wireless communication data via the short range communication link. In some implementations, the additional user domain information is conveyed to the new electronic device 180 via the WLAN after the new device has joined the WLAN.

Once the voice-activated device 180 has been commissioned into the user domain, other devices and their associated activities may be controlled via multiple control paths. In accordance with one control path, an application installed on the client device 166 is used to control the other device and its associated activities (e.g., media play activities). In accordance with another control path, a voice-activated device 180 is used to enable eyes-free and hands-free control of the other device and its associated activities.

Figure 3A:
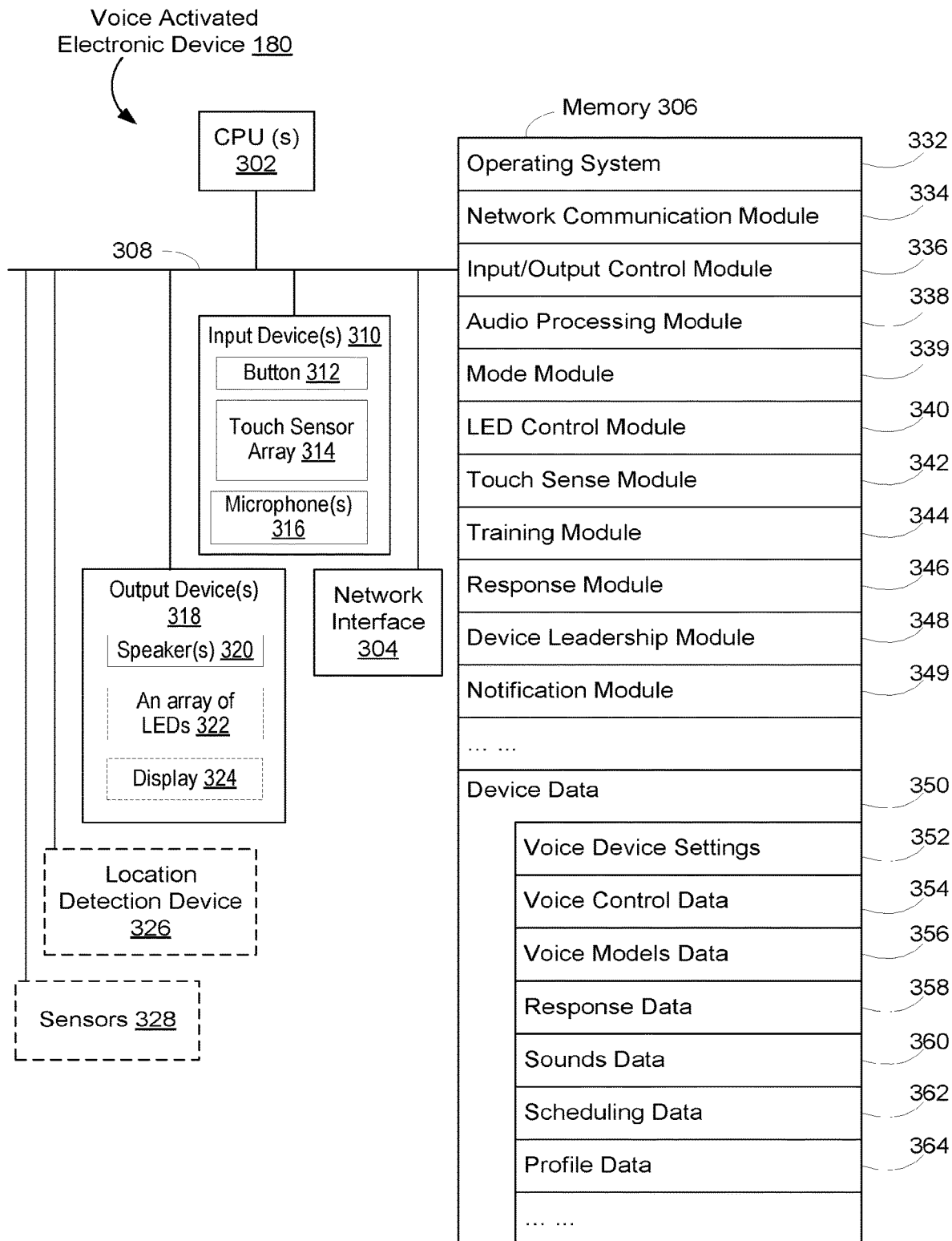
FIG. 3A is a block diagram illustrating a representative voice-activated device in accordance with some implementations.
Figure 3B:
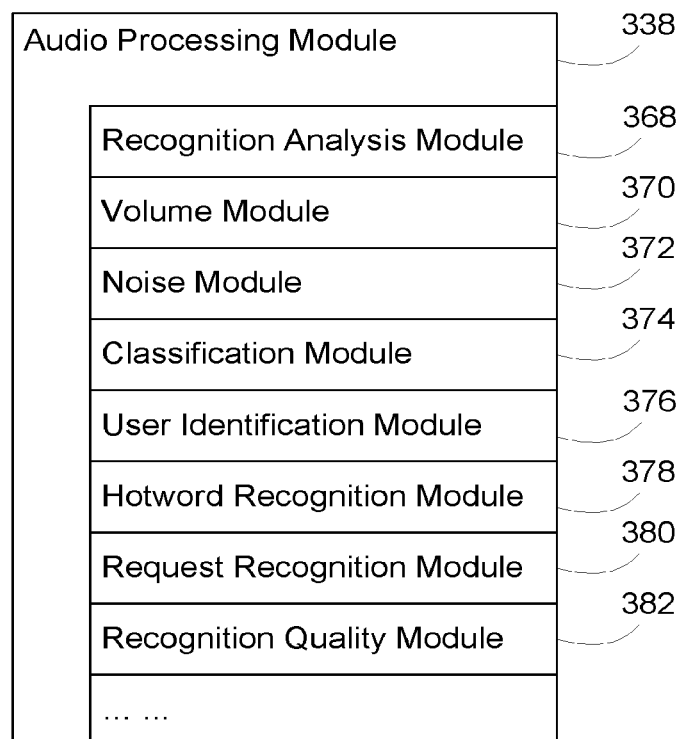
FIG. 3B is a block diagram illustrating sub-modules of the audio processing module of the voice-activated device in FIG. 3A in accordance with some implementations.

FIGS. 3A-3B are block diagrams illustrating a representative voice-activated device 180 in accordance with some implementations. The voice-activated device 180 includes one or more processing units (CPUs) 302, one or more network interface(s) 304, memory 306, and one or more communication buses 308 for interconnecting these components (sometimes called a chipset). The voice-activated device 180 includes one or more input devices 310 that facilitate user input, such as a button 312, a touch sense array 314, and/or one or more microphones 316. The voice-activated device 180 also includes one or more output devices 318, including one or more speakers 320, an array of LEDs 322, and/or a display 324. In some implementations, the array of LEDs 322 is an array of full color LEDs. In some implementations, a voice-activated device 180, depending on the type of device, has either the array of LEDs 322, or the display 324, or both. In some implementations, the voice-activated device 180 also includes a location detection device 326 (e.g., a GPS module) and one or more sensors 328 (e.g., accelerometer, gyroscope, light sensor, etc.).

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other nonvolatile solid state storage devices. The memory 306, optionally, includes one or more storage devices remotely located from one or more processing units 302. The memory 306, or alternatively the non-volatile memory within the memory 306, includes a non-transitory computer-readable storage medium. In some implementations, the memory 306, or the non-transitory computer-readable storage medium of the memory 306, stores the following programs, modules, and data structures, or a subset or superset thereof:

an operating system 332 including procedures for handling various basic system services and for performing hardware dependent tasks;

a network communication module 334 for connecting the voice-activated device 180 to other devices (e.g., the server system 164, one or more cast devices, one or more client devices 166, one or more smart home devices, and other voice-activated device(s) 180) via one or more network interfaces 304 (wired or wireless) and one or more networks 210, such as the Internet, other wide area networks, local area networks (e.g., local network 204), metropolitan area networks, and the like;

an input/output control module 336 for receiving inputs via one or more input devices 310 and enabling presentation of information at the voice-activated device 180 via one or more output devices 318;

an audio processing module 338 for processing audio inputs and voice messages collected from an environment surrounding the voice-activated device 180, and/or preparing the collected audio inputs and voice messages for processing at the voice assistance server 212;

a mode modules 339 for setting and adjusting operating modes of the voice-activated device 180, such as in response to user inputs, one or more predefined schedules, and/or anomalous sounds or events, the operating modes including an assistant mode where the voice-activated device 180 responds to user requests and a monitoring mode where the voice-activated device 180 monitors and responds to unexpected sounds in its environs;

an LED control module 340 for communicating with users via LEDs 322;

a touch sense module 342 for sensing touch events on a touch-sensitive surface (e.g., on the touch sensor array 314) of the voice-activated device 180;

a training module 344 for training and generating voice and/or sound models or fingerprints that can be used to identify sounds, events, and/or voices, and disambiguate users in the user domain that are associated with the voice-activated device 180;

a response module 346 for responding to audio inputs, including performing instructions from voice request responses generated by the voice assistance server 212, generating responses to certain voice inputs (e.g., in an assistant mode), and/or generating responses to certain audio events and sounds (e.g., in a monitoring mode);

a device leadership module 348 for determining a leader amongst multiple voice-activated devices 180 in response to audio inputs;

a notification module 349 for generating and/or displaying notifications for users regarding detected sounds or events and/or notifications regarding an operating state of the voice-activated device; and device data 350 for storing data associated with the voice-activated device 180, including, but not limited to:

voice device settings 352 storing information associated with the voice-activated device 180 itself, such as common device settings (e.g., service tier, device model, storage capacity, processing capabilities, communication capabilities, etc.), information of one or more user accounts in a user domain, settings regarding restrictions when dealing with particular types of users (e.g., non-registered users), and display specifications associated with one or more visual patterns displayed by the LEDs 322;

voice control data 354 storing audio signals, voice messages, response messages, and other data related to voice interface functions of the voice-activated device 180;

voice models data 356 storing voice models or voice fingerprints corresponding to users in the user domain that are associated with the voice-activated device 180;

response data 358 storing information regarding audio and/or visual responses for use in responding to sounds or events (e.g., while in a monitoring mode) in conjunction with response module 346;

sounds data 360 storing sound information, such as sound models or fingerprints, previously received sounds, expected sounds, and the like;

scheduling data 362 storing information regarding user schedules, device mode schedules, operating environment schedules, and the like (e.g., for use in determining whether a detected sound is expected); and profile data 364 for storing profile information for the voice-activated device 180, such as user profiles for users of the device, device profiles, environmental profiles, and the like.

Referring to FIG. 3B, in some implementations, the audio processing module 338 includes the following modules or a subset or superset thereof:

a recognition analysis module 368 for recognizing sounds and audio inputs and, in some implementations, analyzing how different levels of noise affect the operations of the audio processing module 338 (e.g., operation of the hotword recognition module 378, the classification module 374, and/or the request recognition module 380);

a volume module 370 for determining appropriate input and/or output volumes based on user distances from the voice-activated device 180, e.g., for a given distance from the voice-activated device 180, a highest comfortable volume level at which users will utter voice inputs;

a noise module 372 for determining a noise level and/or a noise profile for the environs around the voice-activated device 180;

a classification module 374 for classifying sounds, events, and/or voices detected by the voice-activated device 180 (and/or detected by one or more devices coupled to the voice-activated device 180);

a user identification module 376 for identifying and/or disambiguating users detected by the voice-activated device 180;

a hotword recognition module 378 for determining whether voice inputs include a hotword for waking up the voice-activated device 180 and recognizing such in the voice inputs (e.g., during an assistant mode);

a request recognition module 380 for determining a user request included in a voice input; and a request quality module 382 for determining a quality factor or score for user requests.

Each of the above identified modules are optionally stored in one or more of the memory devices described herein, and corresponds to a set of instructions for performing the functions described above. The above identified modules or programs need not be implemented as separate software programs, procedures, modules or data structures, and thus various subsets of these modules may be combined or otherwise re-arranged in various implementations. In some implementations, the memory 306 stores a subset of the modules and data structures identified above. Furthermore, the memory 306, optionally, stores additional modules and data structures not described above. In some implementations, a subset of the programs, modules, and/or data stored in the memory 306 are stored on and/or executed by the server system 164 and/or the voice assistance server 212.

In some implementations, one or more of the modules in memory 306 described above are part of a voice processing library of modules. The voice processing library may be implemented and embedded on a wide variety of devices. An example of a voice processing library is described in the U.S. Provisional Patent Application No. 62/334,434.

Figure 4:
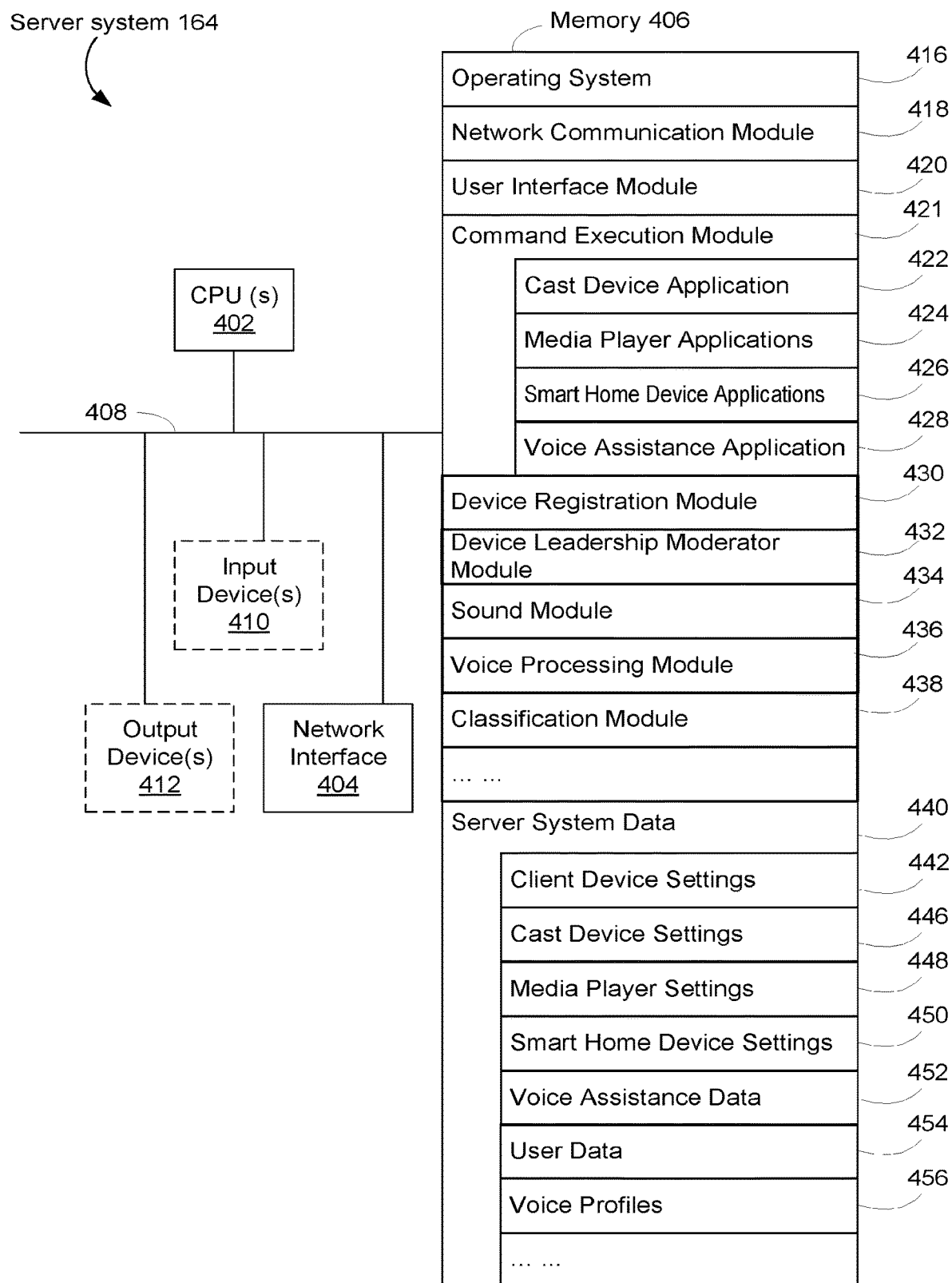
FIG. 4 is a block diagram illustrating a representative server system in accordance with some implementations.

FIG. 4 is a block diagram illustrating a representative server system 164 in accordance with some implementations. An example server of server system 164 is the voice assistance server 212. The server system 164 includes one or more processing units (CPUs) 402, one or more network interfaces 404, memory 406, and one or more communication buses 408 for interconnecting these components (sometimes called a chipset). The server system 164 optionally includes one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 164 optionally uses a microphone and voice recognition or a camera and gesture recognition to supplement or replace the keyboard. In some implementations, the server system 164 includes one or more cameras, scanners, or photo sensor units for capturing images, for example, of graphic series codes printed on the electronic devices. The server system 164 optionally includes one or more output devices 412 that enable presentation of user interfaces and display content, such as one or more speakers and/or one or more visual displays.

The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other nonvolatile solid state storage devices. The memory 406, optionally, includes one or more storage devices remotely located from the one or more processing units 402. The memory 406, or alternatively the non-volatile memory within the memory 406, includes a non-transitory computer-readable storage medium. In some implementations, the memory 406, or the non-transitory computer-readable storage medium of the memory 406, stores the following programs, modules, and data structures, or a subset or superset thereof:

an operating system 416 including procedures for handling various basic system services and for performing hardware dependent tasks;

a network communication module 418 for connecting the server system 164 to other devices (e.g., various servers in the server system 164, client devices, cast devices, electronic devices 180, and smart home devices) via one or more network interfaces 404 (wired or wireless) and one or more networks, such as the Internet, other wide area networks, local area networks, metropolitan area networks, and so on;

a user interface module 420 for enabling presentation of information (e.g., a graphical user interface for presenting application(s), widgets, websites and web pages thereof, games, audio and/or video content, text, etc.) either at the server system or at a client device;

a command execution module 421 for executing commands received from one or more remote devices (e.g., corresponding to games, social network applications, smart home applications, and/or other web or non-web based applications for controlling devices, such as a client device, a cast device, a voice-activated device 180, and a smart home device), including one or more of:
  cast device application 422 that is executed to provide server-side functionalities for device provisioning, device control, and/or user account management associated with cast device(s);
  one or more media player applications 424 that are executed to provide server-side functionalities for media display, and/or user account management associated with corresponding media sources;
  one or more smart home device applications 426 that are executed to provide server-side functionalities for device provisioning, device control, data processing, and/or data review of corresponding smart home devices; and
  a voice assistance application 428 that is executed to arrange voice processing of a voice message received from a voice-activated device 180 and/or process the voice message, e.g., so as to extract a user voice command and one or more parameters for the user voice command (e.g., a designation of a cast device or another electronic device 180);
a device registration module 430 for managing a device registry 118;
a device leadership moderator module 432 for moderating device leadership determinations between voice-activated devices 180 in an operating environment;
a sound module 434 for analyzing sounds captured by voice-activated devices 180, e.g., to recognize users, determine noise levels around the voice-activated devices 180, determine expected sounds for the voice-activated devices 180, determine an expected-sound schedule for the voice-activated devices 180, and the like;
a voice processing module 436 for processing audio inputs and/or voice messages collected in an environment surrounding the voice-activated device 180, e.g., to recognize words or phrases and/or extract one or more parameters from a user command;
a classification module 438 for classifying sounds, noises, voices, and/or audio events, e.g., captured by voice-activated devices 180;
Server system data 440 storing data associated with the server system, including, but not limited to:
  client device settings 442 storing information for one or more client devices, such as common device settings (e.g., service tier, device model, storage capacity, processing capabilities, communication capabilities, etc.), and information for automatic media display control;
  cast device settings 446 storing information for cast devices and/or user accounts of the cast device application 422, such as account access information, information for device settings (e.g., service tier, device model, storage capacity, processing capabilities, communication capabilities, etc.), and information for automatic media display control;
  media player settings 448 storing information for media players and/or user accounts of one or more media player applications 424, such as account access information, user preferences of media content types, review history data, and information for automatic media display control;
  smart home device settings 450 storing information for smart home devices and/or user accounts of the smart home applications 426, such as account access information and information for one or more smart home devices (e.g., service tier, device model, storage capacity, processing capabilities, communication capabilities, etc.);
  voice assistance data 452 storing information for voice-activated devices and/or user accounts of the voice assistance application 428, such as account access information and information for one or more electronic devices 180 (e.g., service tier, device model, storage capacity, processing capabilities, communication capabilities, etc.);
  user data 454 storing information regarding users of the server system 164 and/or voice-activated devices 180, such as users' subscriptions (e.g., music streaming service subscriptions, video streaming service subscriptions, newsletter subscriptions), user devices (e.g., devices registered in the device registry 118 associated with respective users), user accounts (e.g., users' email accounts, calendar accounts, financial accounts), and other user data; and
  voice profiles 456 storing voice profiles of users in the user domain and/or users of voice-activated devices 180, including, for example, voice models and/or voice fingerprints of the users and/or comfortable volume level thresholds of the users.

In some implementations, the server system 164 includes a notification module (not shown) for generating alerts and/or notifications for users. For example, in some implementations the notification module generates alerts for users in response to sounds or audio events captured by one or more voice-activated devices 180. In some implementations, the notification module generates an alert or notification in accordance with a classification of a sound or audio event. For example, a sound is classified as an unknown sound (or as an unexpected sound) and an alert is generated and sent to a user of the voice-activated device 180 notifying him/her of the detection of the unknown or unexpected sound.

In some implementations, the server system 164 includes the voice assistance server 212 and the voice assistance server 212 is primarily responsible for processing of voice inputs and for noise mitigation. In some implementations, one or more of the programs, modules, and data structures in memory 306 described above with reference to FIGS. 3A-3B are included in respective modules in memory 406 (e.g., the programs, modules, and data structures included with audio processing module 338 are included in voice processing module 436). In some implementations, the voice-activated device 180 transmits captured sounds and/or voice inputs to the voice assistance server 212 for processing. In some implementations, the voice-activated device 180 first pre-processes the sounds and/or voice inputs and transmits the pre-processed sounds and/or voice inputs to the voice assistance server 212 for further processing, such as classification and/or recognition. In some implementations, the voice assistance server 212 and the voice-activated device 180 have some shared and some divided responsibilities regarding processing of sounds, voice inputs, and noise mitigation, and the programs, modules, and data structures shown in FIGS. 3A-3B are included in both or divided between the voice assistance server 212 and the voice-activated device 180. In some implementations, other programs, modules, and data structures shown in FIGS.

3A-3B (e.g., training module 344), or analogues thereof, are included in the voice assistance server 212.

Each of the above identified elements may be stored in one or more of the memory devices described herein, and corresponds to a set of instructions for performing the functions described above. The above identified modules or programs need not be implemented as separate software programs, procedures, modules or data structures, and thus various subsets of these modules may be combined or otherwise re-arranged in various implementations. In some implementations, the memory 406, optionally, stores a subset of the modules and data structures identified above. Furthermore, the memory 406 optionally stores additional modules and data structures not described above.

Figure 5B:
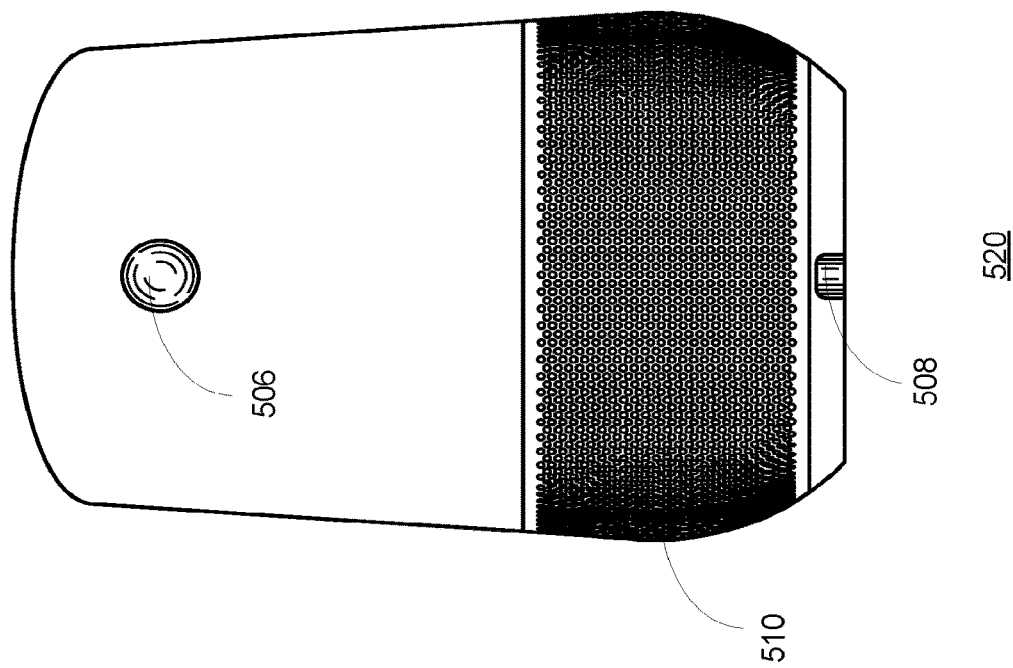
FIGS. 5A and 5B are front and rear views of a representative voice-activated device in accordance with some implementations.
Figure 5A:
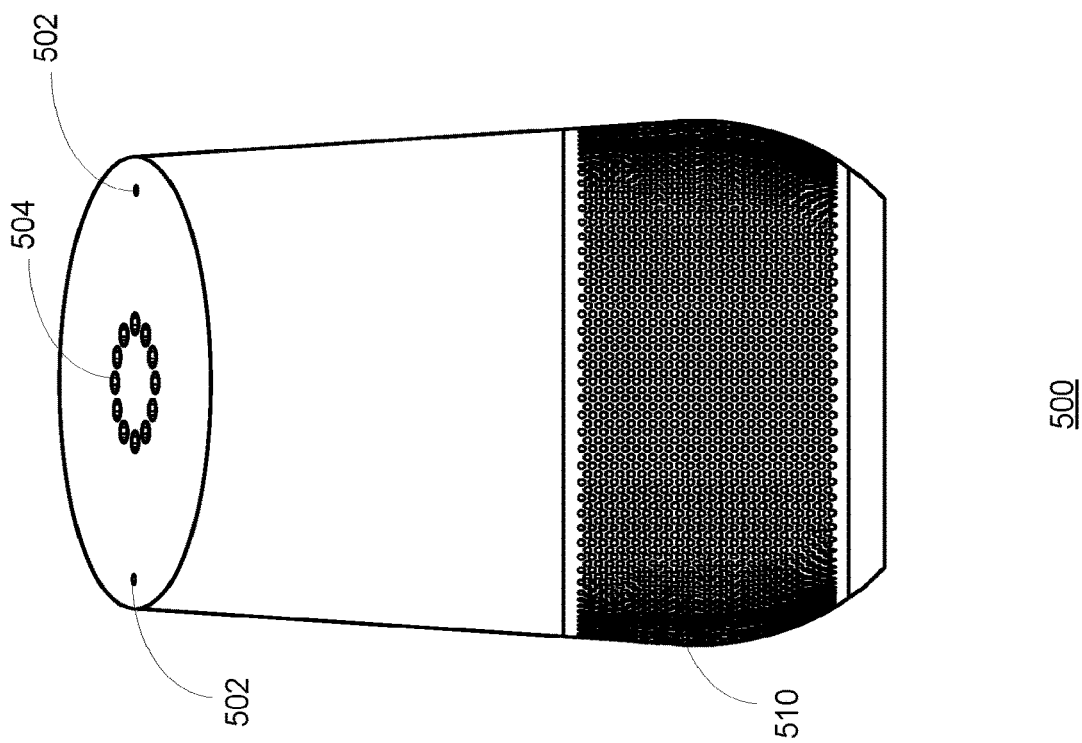

FIGS. 5A and 5B are a front view 500 and a rear view 520 of a voice-activated electronic device 180 in accordance with some implementations. In accordance with some implementations, the voice-activated device 180 is designed as warm and inviting, and fits naturally in many areas of a home. In some implementations, the voice-activated device 180 includes one or more microphones 502 and an array of full color LEDs 504. In some implementations, the full color LEDs 504 are hidden under a top surface of the voice-activated device 180 and invisible to users when not lit. In some implementations, the array of full color LEDs 504 is physically arranged in a ring. Further, the rear side of the voice-activated device 180 optionally includes a power supply connector 508 configured to couple to a power supply.

In some implementations, the voice-activated device 180 presents a clean look having no visible button, and the interaction with the voice-activated device 180 is based on voice and touch gestures. Alternatively, in some implementations, the voice-activated device 180 includes a limited number of physical buttons (e.g., a button 506 on its rear side), and the interaction with the voice-activated device 180 is further based on presses of the button in addition to the voice and/or touch gestures.

In some implementations, given simplicity and low cost of the voice-activated device 180, the voice-activated device 180 includes an array of full color light emitting diodes (LEDs) rather than a full display screen. In some implementations, an LED design language is adopted to configure illumination of the array of full color LEDs and enable different visual patterns indicating different voice processing state of the voice-activated device 180.

In accordance with some implementations, the LED Design Language includes a grammar of colors, patterns, and specific motion applied to a fixed set of full color LEDs. The elements in the language are combined to visually indicate specific device states during the use of the voice-activated device 180. In some implementations, illumination of the full color LEDs aims to clearly delineate the passive listening and active listening states of the voice-activated device 180 among other important states. Placement of the full color LEDs complies with physical constraints of the voice-activated device 180, and the array of full color LEDs could be used in a speaker that is made by a third party original equipment manufacturer (OEM) based on specific technology (e.g., Google Assistant). When the array of full color LEDs is used in a speaker that is made by a third party OEM based on specific technology, the full color LEDs and the LED design language are configured to fit a corresponding physical user interface of the OEM speaker. In this situation, device states of the OEM speaker remain the same, while specific visual patterns representing the device states could be varied (for example, the colors of the full color LEDs could be different but are displayed with similar animation effects).

In a voice-activated electronic device 180, passive listening occurs when the voice-activated device 180 processes audio inputs collected from its surrounding environment but does not store the audio inputs or transmit the audio inputs to any remote server. In contrast, active listening occurs when the voice-activated device 180 stores the audio inputs collected from its surrounding environment and/or shares the audio inputs with a remote server. In accordance with some implementations, the voice-activated device 180 passively listens to the audio inputs in its surrounding environment without breaching privacy of users of the voice-activated device 180 unless and until commanded by a user to enter an active listening state.

Figure 5C:
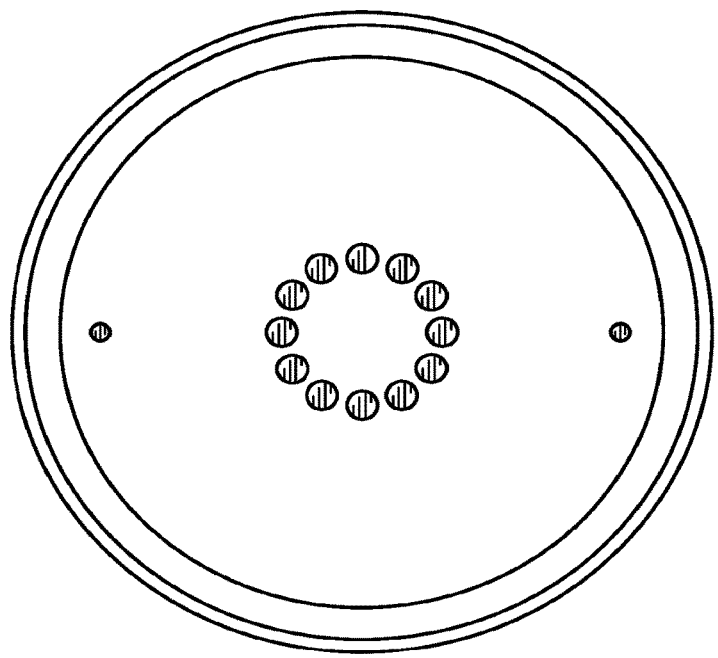
FIG. 5C is a top view of a representative voice-activated device in accordance with some implementations.
Figure 5D:
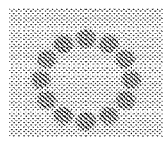
FIG. 5D shows six visual patterns displayed by an array of full color LEDs for indicating voice processing states of the representative voice-activated device in accordance with some implementations.
Figure 5D:
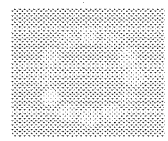
Figure 5D:
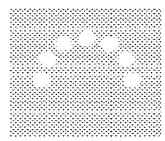
Figure 5D:
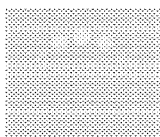
Figure 5D:
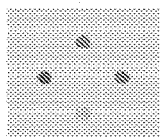
Figure 5D:
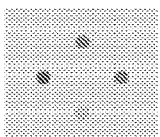
Figure 5D:
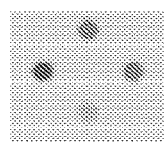
Figure 5D:
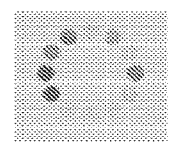
Figure 5D:
Figure 5D:
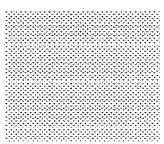
Figure 5D:
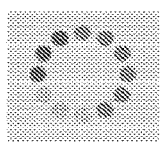
Figure 5D:
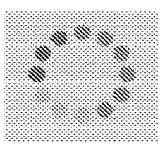

FIG. 5C is a top view of a voice-activated electronic device 180 in accordance with some implementations, and FIG. 5D shows six visual patterns displayed by an array of full color LEDs for indicating voice processing states in accordance with some implementations. In some implementations, the voice-activated device 180 does not include any display screen, and the full color LEDs provide a simple and low cost visual user interface compared with the a full display screen. The full color LEDs could be hidden under a top surface of the electronic device and invisible to the user when they are not lit. Referring to FIGS. 5C and 5D, in some implementations, the array of full color LEDs are physically arranged in a ring.

Figure 6A:
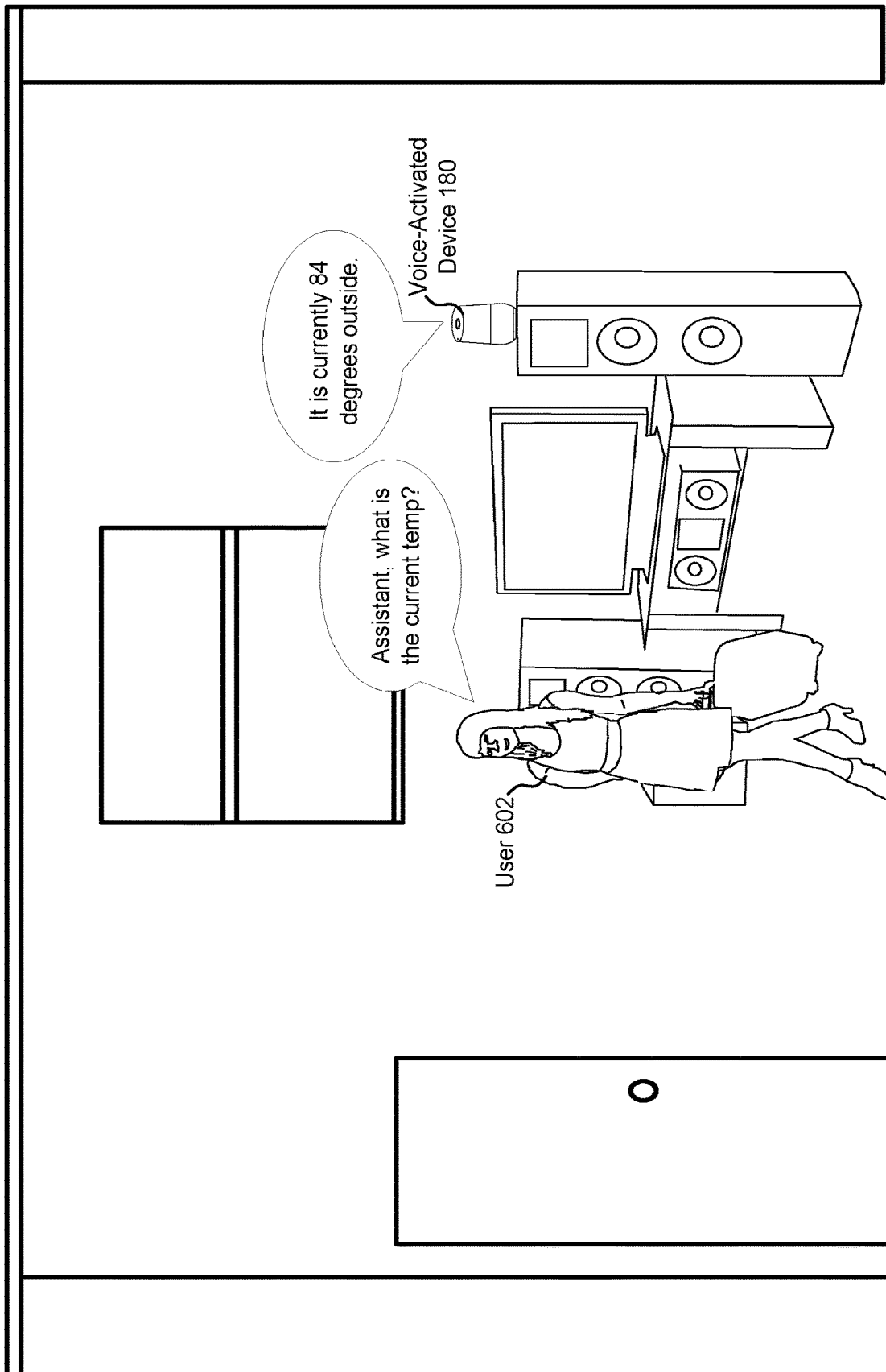
FIGS. 6A-6F illustrate example voice-activated device interactions in accordance with some implementations.

FIGS. 6A-6F illustrate example voice-activated device interactions in accordance with some implementations. FIG. 6A shows a user 602 interacting with the voice-activated device 102. In FIG. 6A the user 602 is asking the voice-activated device 180 for the current temperature. In accordance with some implementations, the user 602 is saying "assistant" because "assistant" is a hotword and the voice-activated device 180 is configured to enter an active listening state upon receipt of the hotword. In the example illustrated in FIG. 6A the voice-activated device 180 responds to the user 602's query by stating that the current temperature is 84 degrees.

Figure 6B:
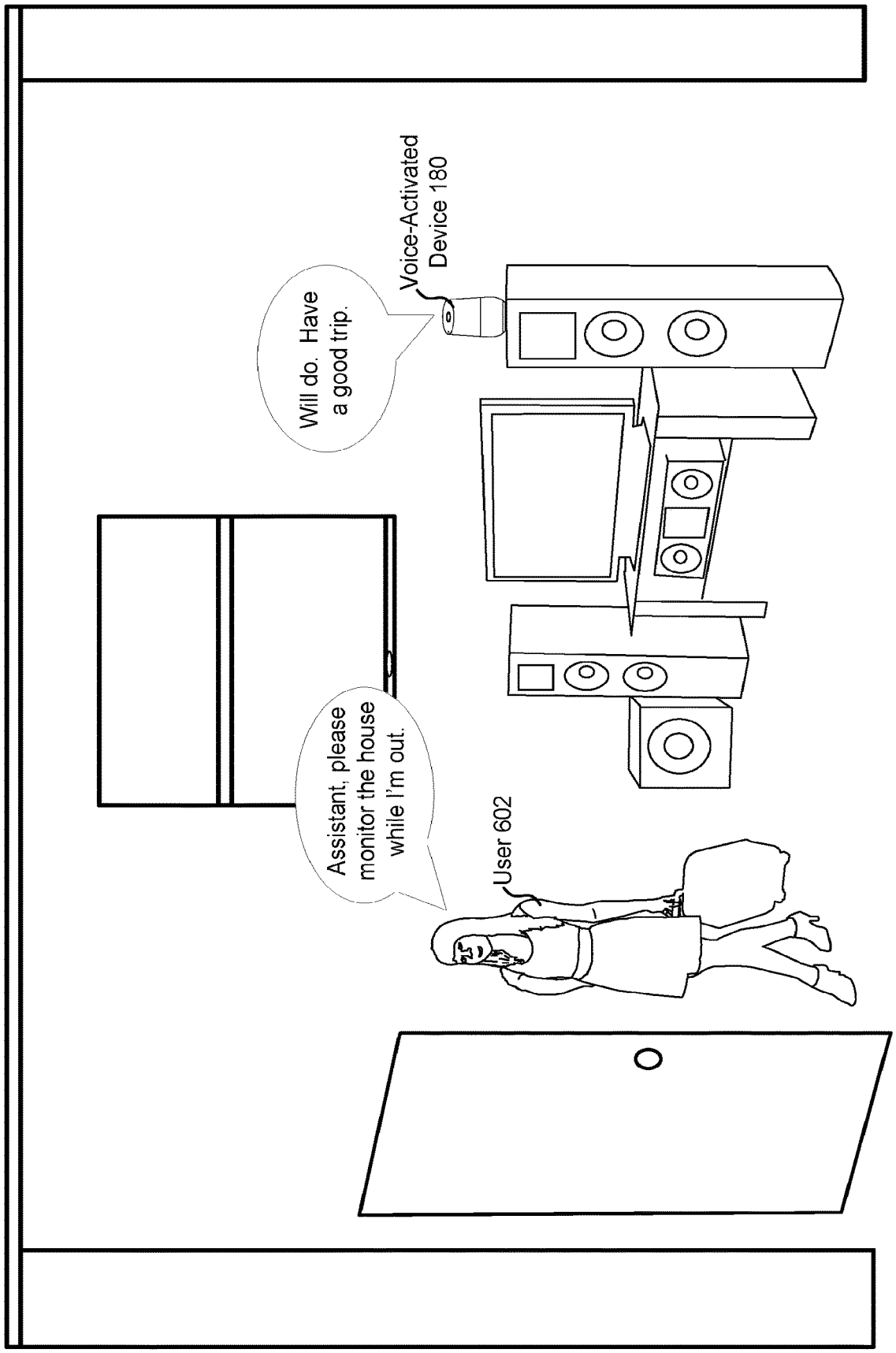

FIG. 6B shows the user 602 requesting that the voice-activated device 180 monitor the home environment (e.g., enter a monitoring mode). FIG. 6B also shows the voice-activated device 180 confirming receipt of the user request. In accordance with some implementations, the voice-activated device 180 changes from an assistant mode to a monitoring mode in response to the user request. In some implementations, while in the monitoring mode, the voice-activated device 180 monitors sounds in the home environment and alerts the user and/or the authorities in response to unexpected or anomalous sounds.

Figure 6C:
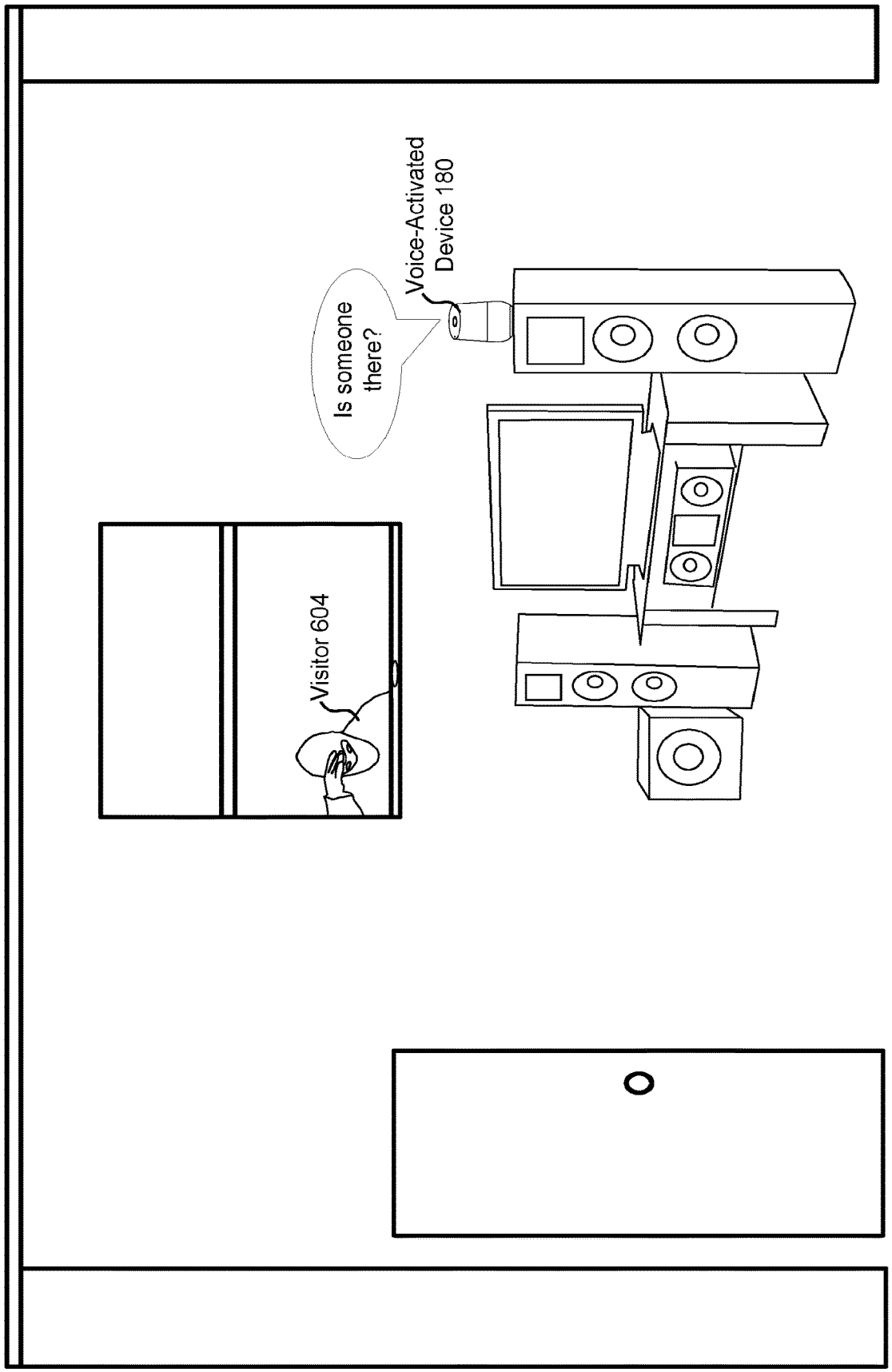

FIG. 6C shows an unwelcome visitor 604 attempting to access the home. FIG. 6C further shows the voice-activated device 180 detecting a sound from the visitor 604 and responding with a query: "is someone there?" In some implementations, the voice-activated device 180 responds with a pre-recorded response from the user 602. In some implementations, voice-activated device 180 mimic's the user 602's voice so as to make the visitor 604 think the user 602 is home. In some implementations, the voice-activated device 180 detects a sound and sends a recording of the sound to the server system 164 for processing and classification. In some implementations, the voice-activated device 180 issues an audible (e.g., verbal) response in response to receiving a classification or instruction from the server system 164.

Figure 6D:
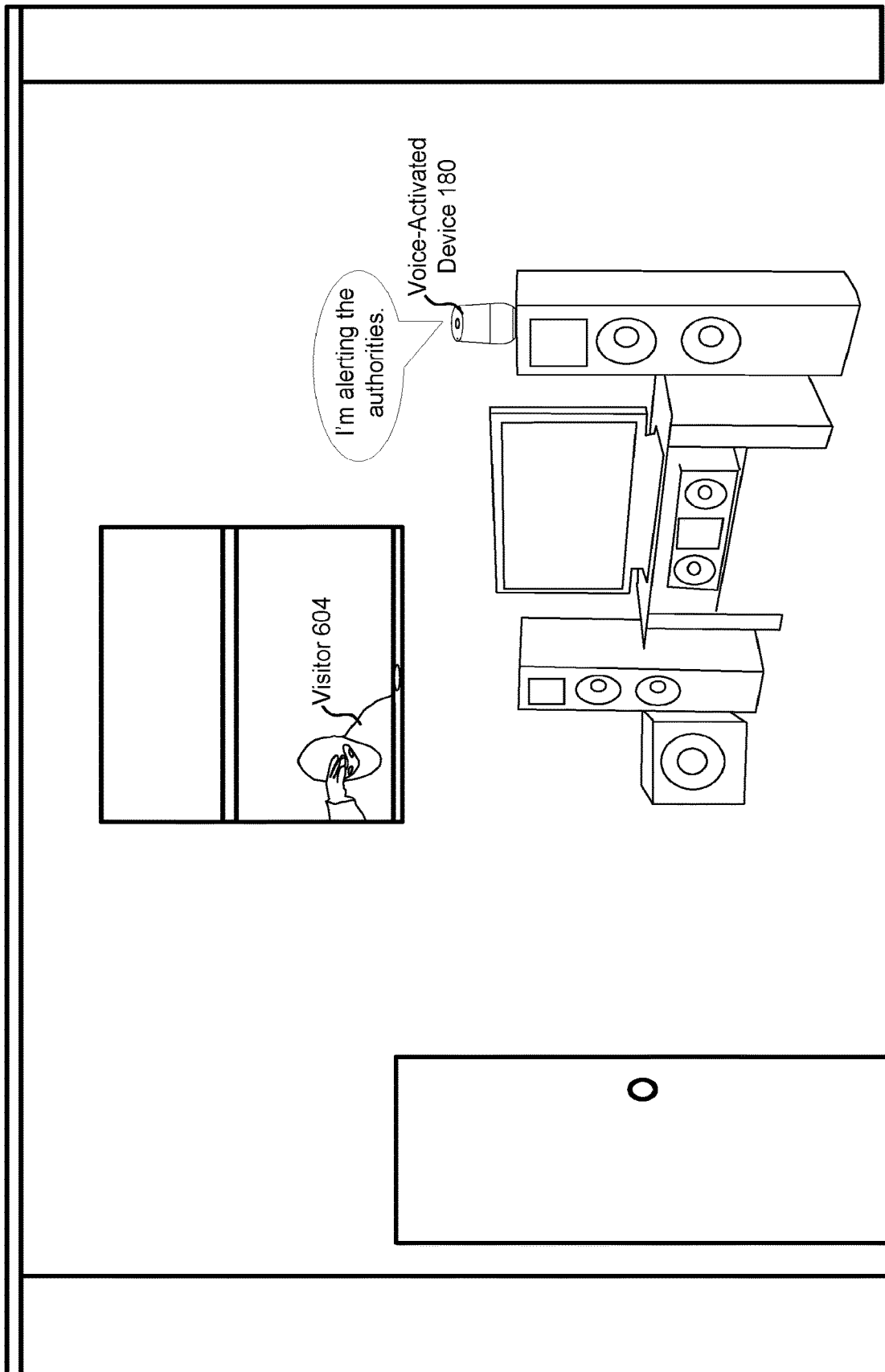

FIG. 6D also shows an unwelcome visitor 604 attempting to access the home. In FIG. 6D the voice-activated device 180 detects a sound from the visitor 604 and responds with a warning about alerting the authorities. In some implementations, the voice-activated device 180 alerts the authorities and/or the user 602.

Figure 6E:
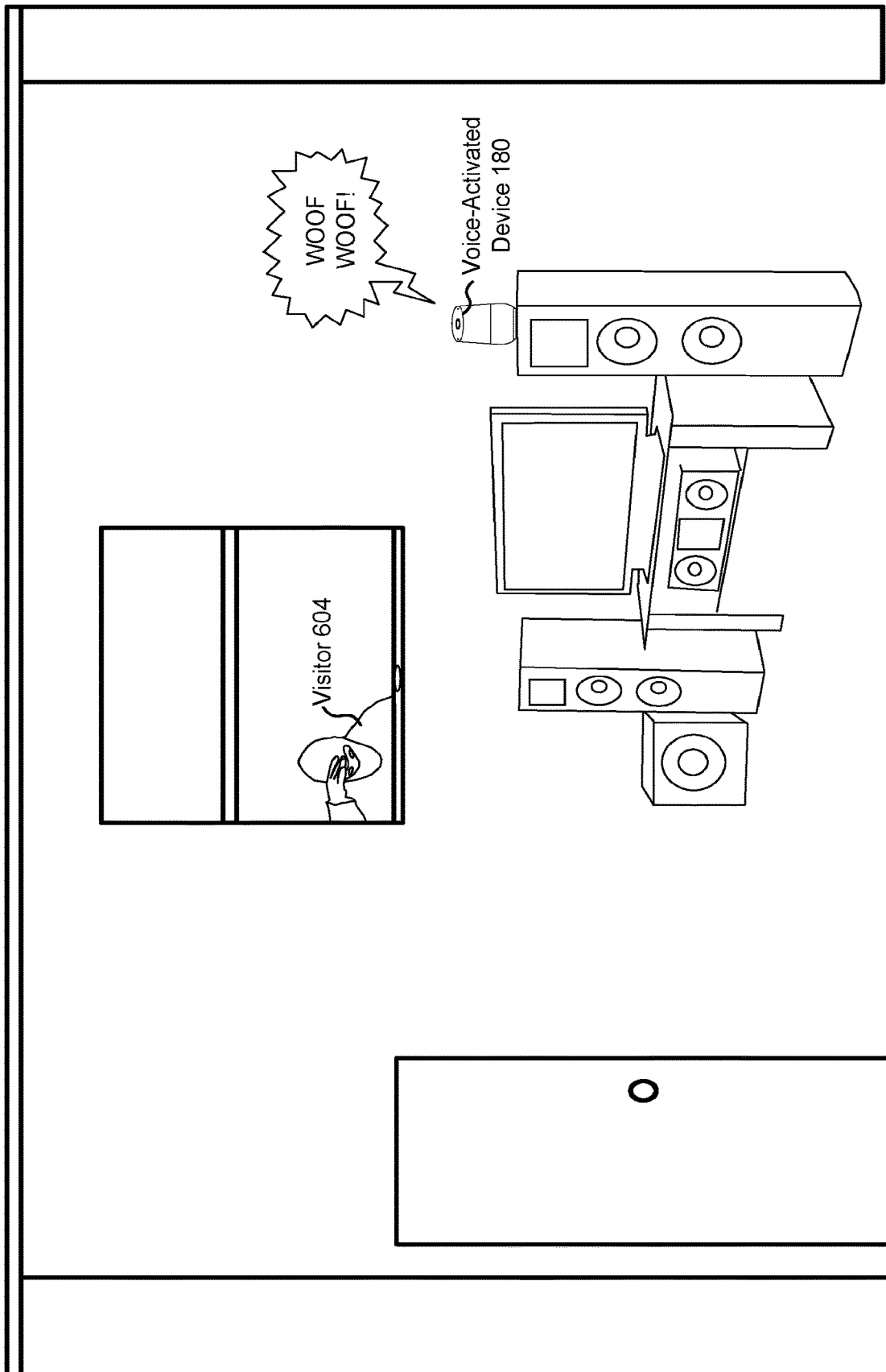

FIG. 6E also shows an unwelcome visitor 604 attempting to access the home. In FIG. 6E the voice-activated device 180 detects a sound from the visitor 604 and responds with simulated barking. In some implementations, the voice-activated device 180 verbally responds with a query (as shown in FIG. 6C), a warning (as shown in FIG. 6D), or simulated barking (as shown in FIG. 6E) based on one or more user or device settings.

Figure 6F:
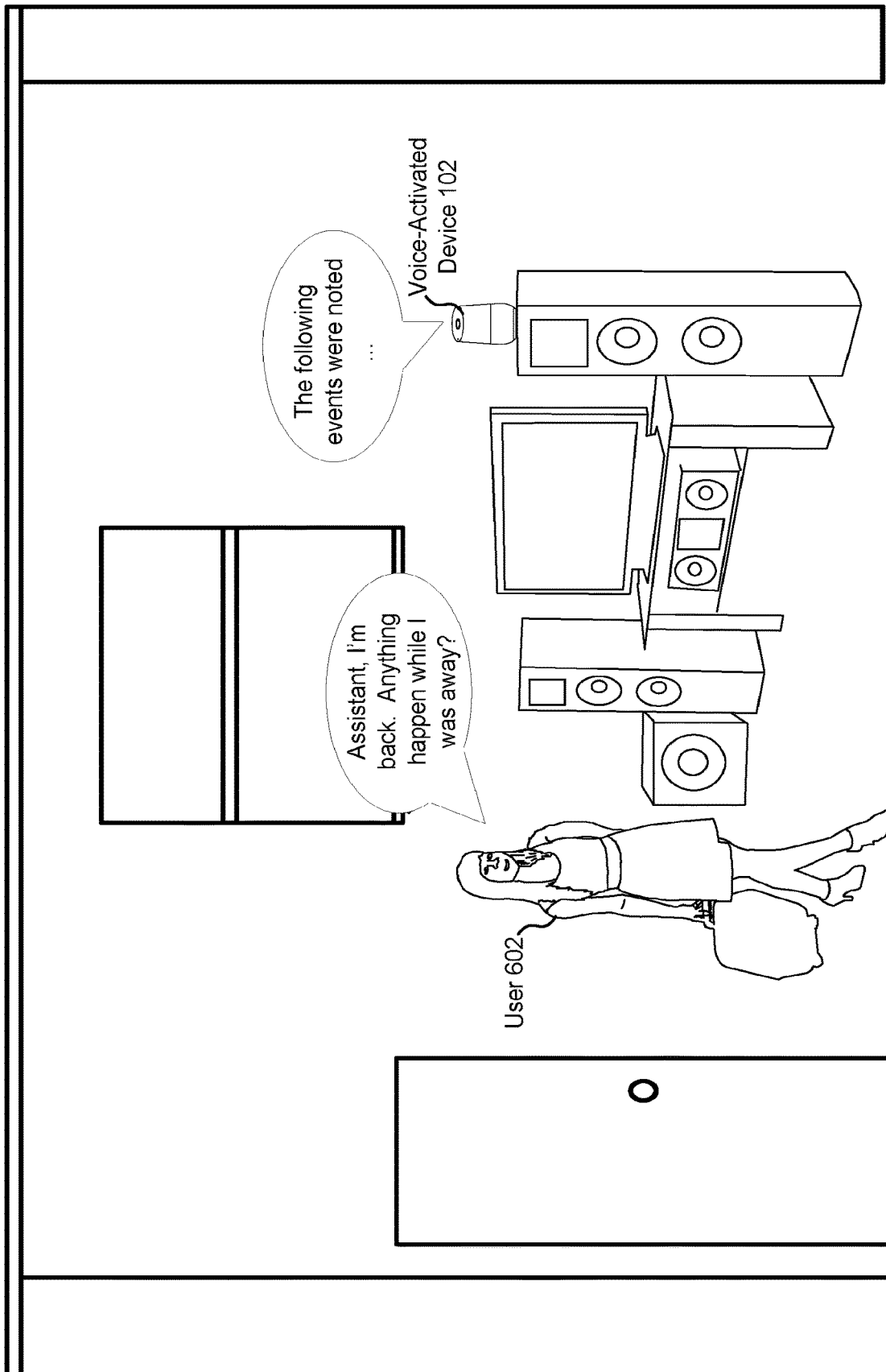

FIG. 6F shows the user 602 returning to the home and asking the voice-activated device 180 for a summary or list of audio events (if any) that occurred while the user was away. FIG. 6F also shows the voice-activated device 180 responding to the user 602's query by listing audio events that occurred while the user was away. In some implementations, the voice-activated device 180 plays back a recording of the audio events (e.g., in response to a user request for more information). In some implementations, the voice-activated device 180 only lists unexpected or anomalous audio events. In some implementations, the voice-activated device 180 lists additional details about the audio events, such as times, classifications, durations, responses, and the like (e.g., in response to a request for more details). In some implementations, the voice-activated device 180 directs the user to visit a corresponding webpage and/or application interface. In some implementations, the corresponding webpage and/or application interface includes information on some or all of the audio events that occurred while the user was away. In some implementations, the corresponding webpage and/or application interface enables playback of the audio events. In some implementations, in response to the user 602 asserting that she has returned, the voice-activated device 180 changes to an assistant mode. In some implementations, the voice-activated device 180 changes to the assistant mode in response to the user activating a door lock or security panel. In some implementations, the voice-activated device 180 detects that the user 602 has returned (e.g., based on location data from a personal device of the user) and changes to the assistant mode in response to that detection.

Figure 7A:
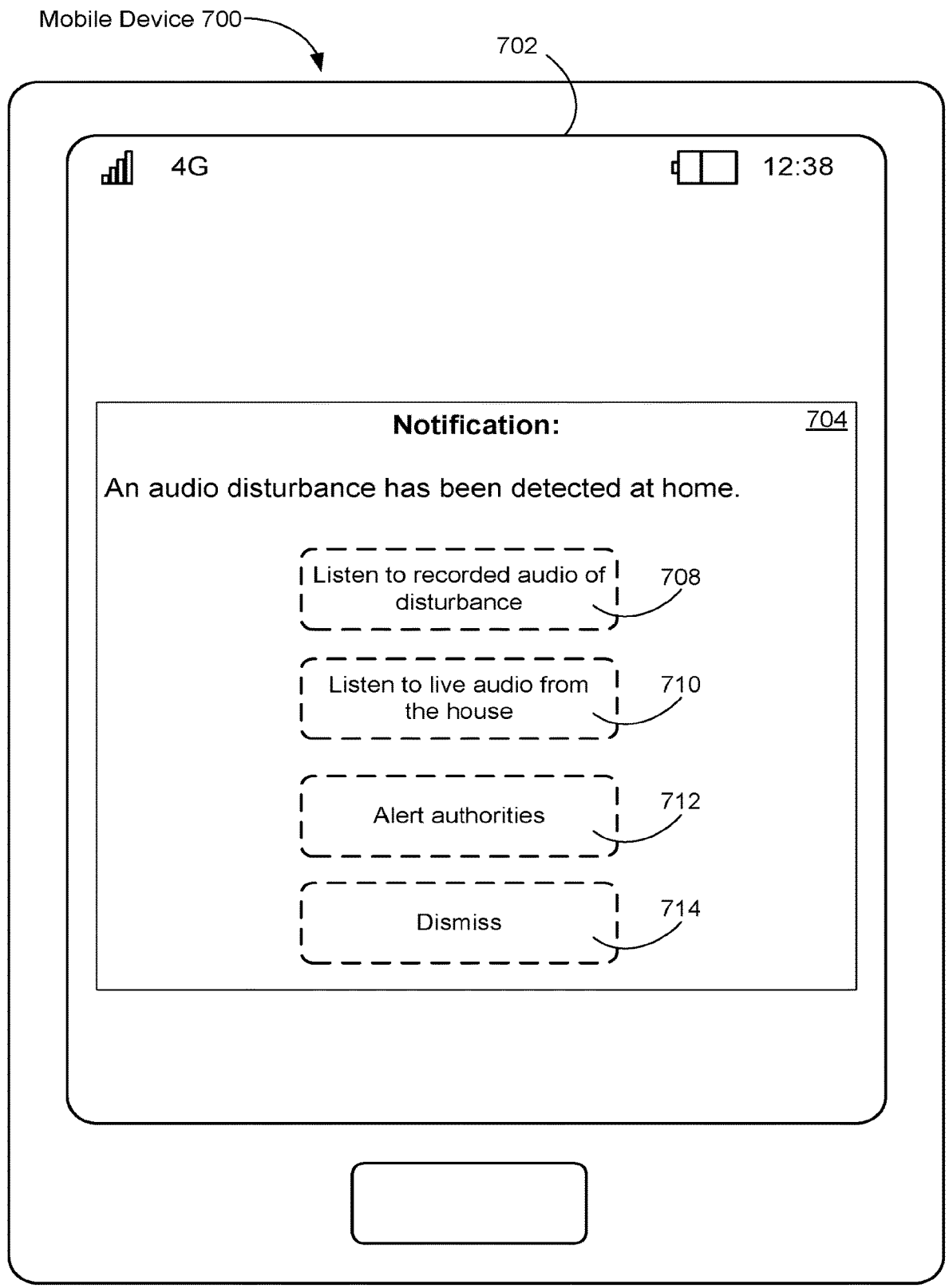
FIGS. 7A-7B illustrate representative user interfaces for voice-activated devices in accordance with some implementations.
Figure 7B:
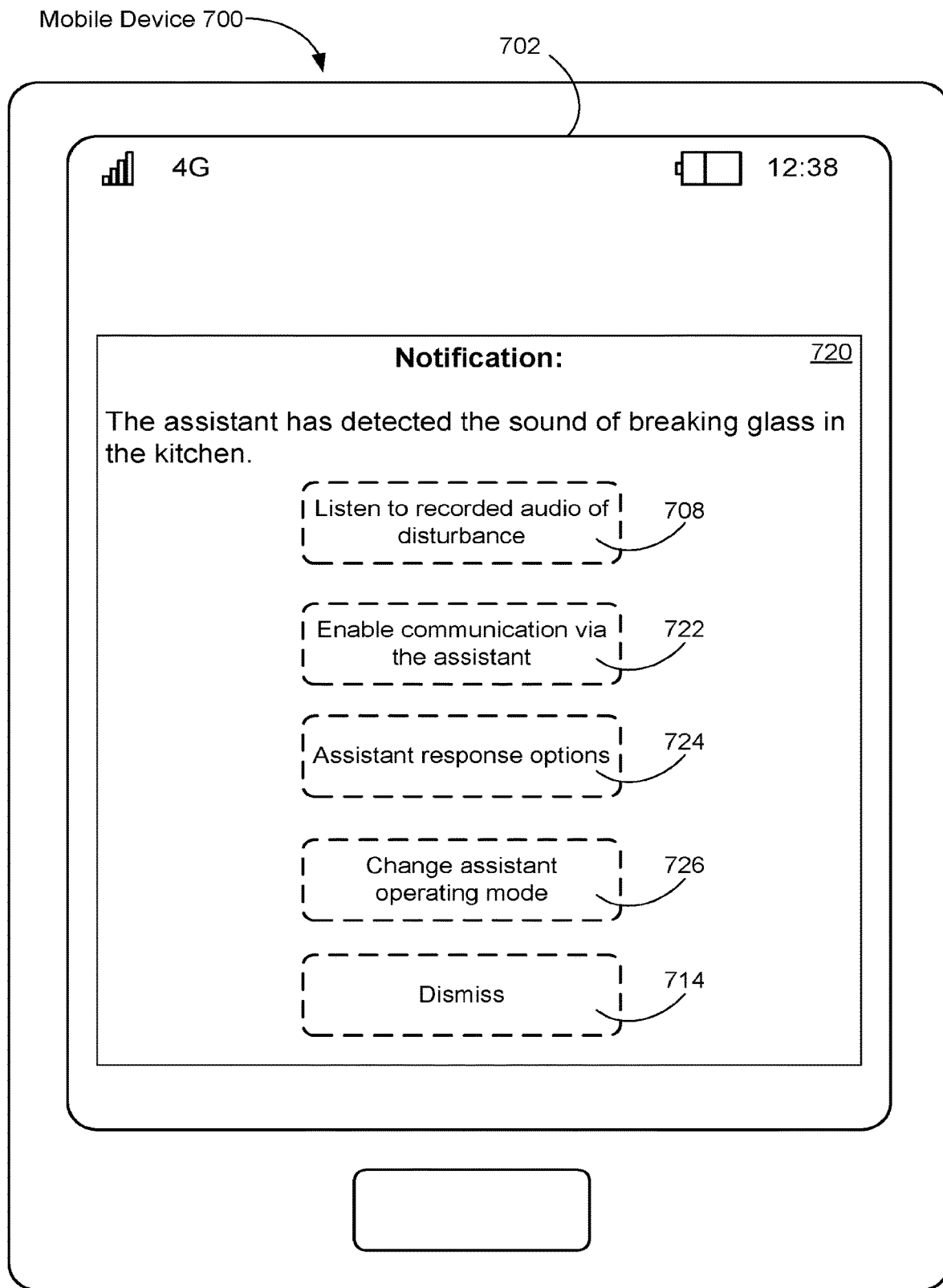

FIGS. 7A-7B illustrate representative user interfaces for voice-activated devices in accordance with some implementations. FIG. 7A shows a user's mobile device 700 (e.g., portable device 166) displaying a user interface 702 that includes a notification 704 regarding audio at the user's home. In some implementations, the voice-activated device 180 sends the notification to the user in response to detecting an unexpected or anomalous sound. In some implementations, the server system 164 sends the notification to the user. The notification 704 includes one or more user options, such as an option 708 to listen to a recording of the audio event, an option 710 to listen to real-time audio from the home, an option 712 to alert the authorities to a potential intrusion or emergency in the home, and an option 714 to dismiss the notification.

In some implementations, the notification includes an option to open an application on the mobile device 700 and the application enables the user to access more details and/or respond to the audio event. In some implementations, the notification is sent to one or more electronic devices of the user, such as a mobile phone, tablet, laptop computer, desktop computer, smart watch, and the like. In some implementations, the notification includes one or more visual characteristics indicative of a classification of the audio event. For example, an audio event classified as the sound of an intruder breaking a glass window is displayed in a predominantly red color while an audio event classified as the sound of a visitor ringing the doorbell is displayed in a predominantly green color.

In some implementations, the voice-activated device 180 is coupled with one or more smart devices in the home and the notification includes an affordance to review information from one or more of the smart devices correlating to the audio event. For example, the voice-activated device 180 is coupled to one or more cameras 118 and the notification includes an affordance for the user to view video data from the cameras (e.g., a live video stream and/or recorded video corresponding to the audio event).

FIG. 7B shows the user's mobile device 700 displaying a user interface 702 that includes a notification 720 regarding audio at the user's home. In the example of FIG. 7B the audio event has been classified as glass breaking in the kitchen and the notification 720 indicates the classification. The notification 720 includes one or more user options, such as an option 708 to listen to recorded audio of the event, an option 722 to communicate with the home via the voice-activated device (e.g., the user's words are relayed from the mobile device to the voice-activated device and output via the voice-activated device's speakers), an option 724 for the user to select a response for the voice-activated device to output (e.g., simulating a dog barking or contacting the authorities), an option 726 for changing an operating mode of the voice-activated device 180 (e.g., switching from a monitoring mode to an assistant mode or sleep mode), and an option 714 to dismiss the notification. In some implementations, one or more of the user options described herein are options within an application, such as a smart assistant application, corresponding to the notification (e.g., as an alternative to, or in addition to, the options being in the notification).

In some implementations, the notification 720 (and/or an application corresponding to the notification 720) includes a user option to delete the sound recording. For example, the user determines that the sound comprises a recording of the user and requests that sound recording be deleted for privacy. In this example, the home assistant device deletes instances of the sound recording in accordance with the user request.

Figure 8:
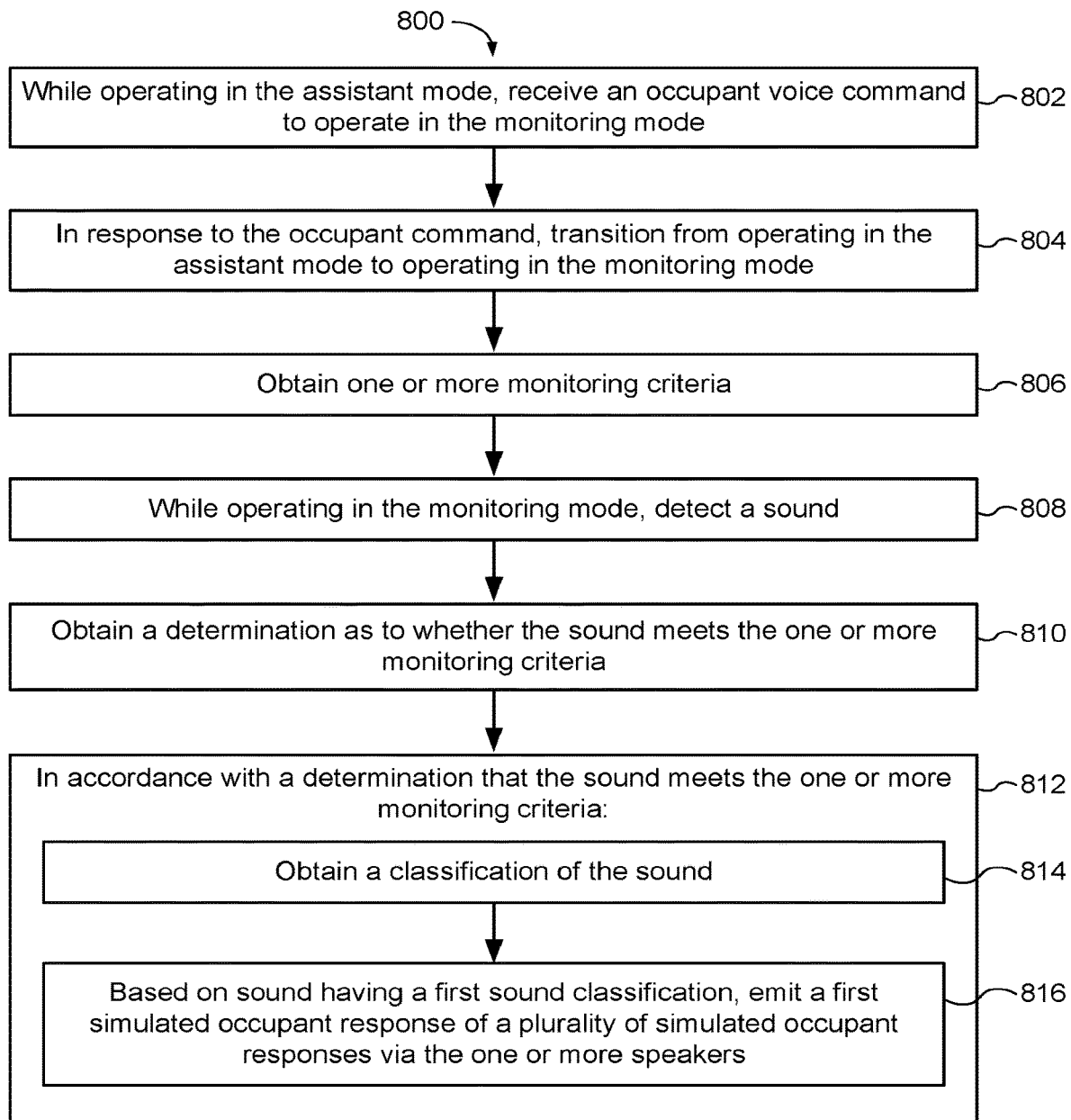
FIG. 8 is a flowchart representation of a method for monitoring activity with a voice-assistant device, in accordance with some implementations.

FIG. 8 is a flowchart representation of a method 800 for monitoring activity, in accordance with some implementations. In some implementations, the method 800 is performed by: (1) one or more electronic devices of one or more systems, such as the voice-activated devices 180 and/or devices of the operating environment 100, FIG. 1; (2) one or more computing systems, such as server system 164 of FIG. 1 and voice assistance server 212 of FIG. 2; or (3) a combination thereof. In some implementations, method 800 is performed by a voice-activated device 180 (FIG. 3A) or a component thereof, such as audio processing module 338. In some implementations, method 800 is performed by a server system 164 or a component thereof, such as voice processing module 436. Thus, in some implementations, respective operations of the method 800 are performed by any of the aforementioned devices, systems, or combination of devices and/or systems. In some implementations, method 800 is governed by instructions that are stored in a non-transitory computer-readable storage medium and that are executed by one or more processors of a device and/or computing system, such as the one or more CPU(s) 302 of voice-activated device 180 and/or the one or more CPU(s) 402 of server system 164. For convenience, method 800 will be described below as being performed by a home assistant device, such as the voice-activated device 180.

While operating in the assistant mode, the home assistant device receives (802) an occupant voice command to operate in the monitoring mode. For example, FIG. 6B shows the user 602 commanding the voice-activated device 180 to operate in a monitoring mode. In some implementations, the voice-activated device 180 receives the command via one or more input device(s) 310, such as a microphone, touch sensor array, or button. In some implementations, the voice-activated device 180 receives the command from an application (e.g., running on a client device of the user) via the network interface 304. In some implementations, while operating in assistant mode the home assistant device listens for one or more hotwords spoken by an occupant of the home environment. In some implementations, receiving the occupant voice command to operate the home assistant in a monitoring mode comprises receiving a natural language command from the occupant via the one or more microphones.

In response to the occupant command, the home assistant device transitions (804) from operating in the assistant mode to operating in the monitoring mode. For example, in response to the user 602 command in FIG. 6B, the voice-activated device 180 transitions to a monitoring mode as shown in FIGS. 6C-6E. In some implementations, the home assistant device processes the occupant command using the audio processing module 338. In some implementations, the home assistant device transitions from the assistant mode to the monitoring mode using mode module 339. In some implementations, while in the monitoring mode, the home assistant device mimics occupant activity within the home environment. For example, the home assistant device enables specific lights or televisions at particular times.

The home assistant device obtains (806) one or more monitoring criteria. In some implementations, the home assistant device obtains the monitoring criteria from a server system (e.g., server system 164). In some implementations, the home assistant device obtains the monitoring criteria from a local database (e.g., device data 350). In some implementations, the home assistant device receives the monitoring criteria from a user (e.g., via an application on the user's client device). In some implementations, the monitoring criteria include a decibel threshold. In some implementations, the monitoring criteria include particular tones, frequencies, pitches, and the like. In some implementations, the monitoring criteria include whether a sound is an expected sound or an ordinary sound for the environment. In some implementations, the monitoring criteria include whether a sound has a particular audio characteristics and/or a particular classification. In some implementations, the monitoring criteria include whether a sound is from a particular occupant or user.

While operating in the monitoring mode, the home assistant device detects (808) a sound. For example, FIG. 6C illustrates the voice-activated device 180 detecting a sound from the visitor 604 and issuing a response. In some implementations, the home assistant device detects the sound via microphone(s) 316. In some implementations, the home assistant device detects a series or sequence of sounds and analyses the series or sequence (e.g., determines whether the series or sequence of sounds meets the one or more monitoring criteria). In some implementations, the home assistant device determines whether the detected sound comprises a hotword. In some implementations, the home assistant device determines whether the hotword was spoken by a recognized and/or authorized user. In some implementations, in accordance with a determination that the sound comprises a hotword was uttered by an authorized user, the home assistant device transitions to an assistant mode.

In some implementations, while in the monitoring mode, the home assistant device anticipates a particular sound will occur within the home environment at a particular time; and, in accordance with a determination that the particular sound did not occur at the particular time, emits a second simulated occupant response via the one or more speakers. For example, the home assistant device determines that a user is expected to verbally check-in at a particular time and in accordance with a determination that the user did not checked-in, emits a simulated response. In some implementations, the home assistant device anticipates a particular sound will occur within the home environment at a particular time; and, in accordance with a determination that the particular sound did not occur at the particular time, generates an alert (e.g., for a user and/or the authorities). In some implementations, the simulated response to the lack of an expected sound event is the same as a simulated response to detection of an unexpected sound event.

The home assistant device obtains (810) a determination as to whether the sound meets the one or more monitoring criteria. In some implementations, obtaining the determination comprises making the determination at the home assistant (e.g., via audio processing module 338). In some implementations, obtaining the determination comprises obtaining the determination from a server system (e.g., server system 164). In some implementations, obtaining the determination as to whether the sound meets the one or more monitoring criteria includes obtaining a determination as to whether the sound meets or exceeds a sound intensity threshold. In some implementations, obtaining the determination as to whether the sound meets the one or more predefined criteria includes obtaining a determination as to whether the sound is an expected sound of the home environment. For example, the home assistant device detects the sound of a dog barking at a given time and determines whether a dog barking at the given time is an expected sound for the particular home environment. In some implementations, determining whether the sound meets the one or more monitoring criteria includes determining whether the sound was detected by one or more other devices in the home environment (e.g., one or more smart devices having microphones). In some implementations, determining whether the sound meets the one or more monitoring criteria includes determining whether the sound originated from within the home environment (or within a geo-fence around the home environment).

In some implementations, obtaining the determination as to whether the sound meets the one or more monitoring criteria includes obtaining a determination as to whether a personal device of an occupant of the home environment is currently remote from the home environment. For example, the occupant's mobile phone indicates that the occupant is at work. In some implementations, obtaining the determination as to whether the sound meets the one or more monitoring criteria includes obtaining a determination as to whether an occupant of the home environment is expected to currently be within the home environment. For example, the occupant is generally at work at the current time; or the occupant's calendar indicates that the occupant is expected to be at work.

In some implementations, the home assistant device obtains a plurality of previously-recorded home environment sounds. In some implementations, obtaining the determination that the sound is not an expected sound of the home environment comprises comparing the sound to the plurality of previously-recorded home environment sounds and not obtaining a match. In some implementations, the previously-recorded home environment sounds comprise sounds from the home environment. In some implementations, the previously-recorded home environment sounds comprise sounds from a plurality of home environments (e.g., home environments similar to the occupant's home environment). In some implementations, comparing the sounds comprises comparing an audio profile of the sound with audio profiles of the previously-recorded sounds. In some implementations, comparing the sounds comprises comparing an audio fingerprint of the sound with audio fingerprints of the previously-recorded sounds.

In accordance with a determination that the sound meets the one or more monitoring criteria (812): the home assistant device (1) obtains (814) a classification of the sound; and (2) based on sound having a first sound classification, emits (816) a first simulated occupant response of a plurality of simulated occupant responses via the one or more speakers. In some implementations, in accordance with the determination that the sound does not meet the one or more monitoring criteria, the home assistant device forgoes obtaining the classification of the sound. In some implementations, based on the sound having a second sound classification, the home assistant device forgoes emitting a simulated occupant response via the one or more speakers. For example, the sound is determined to be a voice of an occupant of the home and therefore the home assistant device takes no action. In some implementations, obtaining the classification of the sound includes determining whether the sound comprises a known sound or unknown sound. In some implementations, obtaining the classification of the sound includes identifying the sound (e.g., identifying the sound as that of breaking glass, or a dog barking). In some implementations, obtaining the classification of the sound includes identifying a likely source of the sound (e.g., identifying the sound as originating from a particular object or entity). In some implementations, obtaining the classification comprises obtaining the classification from a server system 164 (e.g., in response to uploading the sound to the server system). In some implementations, obtaining the classification comprises obtaining the classification from the classification module 374 at the home assistant device. In some implementations, the home assistant device obtains the classification of the sound without obtaining a determination as to whether or not the sound meets the one or more monitoring criteria. In some implementations, the home assistant device emits the first simulated occupant response without obtaining a determination as to whether or not the sound meets the one or more monitoring criteria.

In some implementations, obtaining the classification of the sound includes obtaining a determination as to whether the sound comprises a voice of an occupant of the home environment. For example, the sound is that of an occupant speaking. In some implementations, in accordance with the sound having a first classification, the home assistant stores the sound (e.g., for further analysis and/or playback) and/or sends the sound to a server system. In some implementations, in accordance with the sound having a second classification, the home assistant forgoes storing the sound and forgoes sending the sound to a server system.

In some implementations, obtaining the classification of the sound includes obtaining a determination as to whether a personal device of an occupant of the home environment is currently remote from the home environment. For example, the occupant's mobile phone indicates that the occupant is at work. In some implementations, obtaining the classification of the sound includes obtaining a determination as to whether an occupant of the home environment is expected to currently be within the home environment. For example, the occupant is generally at work at the current time; or the occupant's calendar indicates that the occupant is expected to be at work. In some implementations, in accordance with a determination that the occupant of the home environment is expected to currently be within the home environment, the home assistant device emits a second simulated occupant response via the one or more speakers, the second simulated occupant response distinct from the simulated occupant response. For example, the first response comprises a dog barking and the second response comprises the assistant asking: "Are you home from work?"

In some implementations, the plurality of simulated occupant responses includes one or more of: a simulated animal response (e.g., a dog barking); a pre-recorded occupant response (e.g., an occupant recording saying "Who's there"); a request for identification (e.g., a request for a pin code); and a simulated human response (e.g., saying "Is someone there").

In some implementations, the home assistant device responds with an alarm sound (e.g., in addition to, or alternatively to, emitting a simulated response). In some implementations, the home assistant device responds with a sound of the user's choosing. For example, the home assistant device enables the user to record or upload a desired response, and the home assistant device emits the desired response in accordance with a determination that a detected sound has a first sound classification.

In some implementations, in accordance with the determination that the sound meets the one or more monitoring criteria or in accordance with a determination that the sound has a first classification, the home assistant device performs one or more of: adjusting a lighting level of the home environment (e.g., turning on a light); adjusting a user interface of the home assistant to indicate that the sound meeting the one or more predefined criteria was detected (e.g., flashing an LED on the assistant); storing the sound (e.g., for later listening by the user); enabling a home device (e.g., turning on a tv or radio); and sending an alert (e.g., to a user and/or to the police).

In some implementations, in accordance with the determination that the sound meets the one or more monitoring criteria or in accordance with a determination that the sound has a first classification, the home assistant device enables a remote occupant of the home environment to listen to the sound. For example, the home assistant device stores the sound for later playback and/or sends a recording of the sound to the occupant's mobile device. In some implementations, in accordance with the determination that the sound meets the one or more monitoring criteria or in accordance with a determination that the sound has a first classification, the home assistant device enables a remote occupant to listen to the home environment via the one or more microphones. For example, the home assistant device streams real-time audio to a remote occupant. In some implementations, the home assistant device enables the remote occupant or user to converse with the home environment (e.g., converse with a person in the home) by relaying messages between the home assistant and the remote occupant or user's mobile device.

In some implementations, while operating in the monitoring mode, the home assistant device receives an occupant command to operate in the assistant mode; and in accordance with the occupant command, transitions to operating in the assistant mode. In some implementations, the home assistant verifies that the second occupant command comprises a command from an authorized user; and transitions to operating in the assistant mode in accordance with verification of the second occupant command.

In some implementations, the home assistant device receives an occupant command to operate the computer system in a learning mode. In some implementations, in response to the occupant command, the home assistant device transitions to operating in the learning mode. In some implementations, while operating in the learning mode, the home assistant device analyzes sounds of the home environment to identify a plurality of expected sounds within the home environment.

In some implementations, while operating in the learning mode, the home assistant detects a sound in the home environment via the one or more microphones. In some implementations, in response to detecting the sound, the home assistant device transmits a request to a user, the request requesting that the user classify (or identify) the second sound. In some implementations, in response to the request, the home assistant device receives a classification of the sound from the user. For example, the user identifies a previously detected rumbling noise as the garage door opening. In some implementations, the home assistant device associates the sound with the classification.

In some implementations, the home assistant device is coupled to one or more additional home assistant devices within the home environment. In some implementations, in accordance with the determination that the sound meets the one or more monitoring criteria, the home assistant device requests that at least one of the one or more additional home assistant devices simulates an occupant response to the sound. For example, a first home assistant detects the sound and a second home assistant simulates a dog barking (optionally while the first home assistant simulates a person). In some implementations, the home assistant device is coupled to one or more smart devices and, in response to an unexpected sound, instructs the one or more smart devices to respond (e.g., respond by enabling a lock, turning on a light, sounding an alarm, etc.).

In some implementations, the home assistant device is coupled to one or more additional computer systems (e.g., smart devices) within the home environment. In some implementations, the home assistant device receives notification of a sound meeting one or more predefined criteria from at least one of the one or more additional computer systems; and, in response to receiving notification of the sound, emits a second simulated occupant response via the one or more speakers. In some implementations, the one or more predefined criteria are distinct from the one or more monitoring criteria of the home assistant device. For example, each home assistant has distinct criteria based on each assistant's learning of its portion of the home environment. As an example, a home assistant in the garage may expect sounds related to cars and garage doors while a home assistant at the other end of the home does not expect such sounds.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first type of classification could be termed a second type of classification, and, similarly, a second type of classification could be termed a first type of classification, without departing from the scope of the various described implementations. The first type of classification and the second type of classification are both types of classifications, but they are not the same type of classification.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for monitoring activity in a home environment, comprising:
    receiving, by a computer system via one or more microphones, a voice command, wherein the computer system comprises a voice-activated user interface, the one or more microphones, one or more speakers, one or more processors, and memory;
    outputting, via the one or more speakers, a spoken response to the voice command;
    after outputting the spoken response, detecting, by the computer system via the one or more microphones, a sound;
    in response to detecting the sound, transmitting, by the computer system to a cloud-computing server system, a recording of the sound;
    obtaining, by the computer system, a determination that the detected sound meets one or more monitoring criteria; and
    in accordance with the determination that the sound meets the one or more monitoring criteria, causing a notification to be output to a mobile device, wherein the notification provides access for a user of the mobile device to the recording of the sound stored by the cloud-computing server system.

2. The method of claim 1, wherein the notification is indicative of breaking glass.

3. The method of claim 2, wherein the notification is further indicative of a location of the breaking glass.

4. The method of claim 1, further comprising:
    outputting, for presentation, the notification on the mobile device.

5. The method of claim 4, wherein the notification allows viewing of video captured using a camera corresponding to the sound.

6. The method of claim 1, wherein obtaining the determination that the detected sound meets one or more monitoring criteria comprises obtaining the determination from a remote server system.

7. The method of claim 1, wherein obtaining the determination that the detected sound meets one or more monitoring criteria comprises determining whether a personal device of an occupant of the home is remote from the home environment in which the computer system is present.

8. The method of claim 1, wherein generating the notification comprises emitting a response, a simulated human response, or a simulated animal response.

9. The method of claim 1, wherein generating the notification includes performing one or more of:
    adjusting a lighting level of the home environment; and
    enabling a home device.

10. The method of claim 1, further comprising, in accordance with the determination that the sound meets the one or more monitoring criteria:
    enabling a remote occupant of the home environment to perform one or more of: listen to the sound, and listen to the home environment via the one or more microphones.

11. The method of claim 1, wherein the computer system is coupled to one or more additional computer systems within the home environment; and the method further comprises, in accordance with the determination that the sound meets the one or more monitoring criteria, requesting that at least one additional computer system output the notification.

12. A computer system comprising:
    a voice-activated user interface;
    one or more microphones;
    one or more speakers;
    one or more processors coupled to the one or more microphones and the one or more speakers; and
    memory coupled to the one or more processors, the memory storing one or more programs configured to be executed by the one or more processors, the one or more programs including instructions for:
        receiving, via the one or more microphones, a voice command;
        outputting, via the one or more speakers, a spoken response to the voice command;
        after outputting the spoken response, detecting, via the one or more microphones, a sound;
        transmitting, by the computer system to a cloud-computing server system, a recording of the sound;
        obtaining a determination that the detected sound meets one or more monitoring criteria; and
        in accordance with the determination that the sound meets the one or more monitoring criteria, causing a notification to be output to a mobile device, wherein the notification provides access for a user of the mobile device to the recording of the sound stored by the cloud-computing server system.

13. The computer system of claim 12, wherein the notification is indicative of breaking glass.

14. The computer system of claim 13, wherein the notification is further indicative of a location of the breaking glass.

15. The computer system of claim 12, further comprising:
    outputting, for presentation, the notification on the mobile device.

16. The computer system of claim 15, wherein the notification allows viewing of video captured using a camera corresponding to the sound.

17. The computer system of claim 12, wherein obtaining the determination that the detected sound meets one or more monitoring criteria comprises obtaining the determination from a remote server system.

18. A non-transitory computer-readable storage medium storing one or more programs, the one or more programs comprising instructions, which when executed by a computing system having one or more processors, memory, a voice-activated user interface, one or more microphones and one or more speakers, cause the computing system to:
    receive, via the one or more microphones, a voice command;
    output, via the one or more speakers, a spoken response to the voice command;
    after outputting the spoken response, detecting, via the one or more microphones, a sound;
    in response to detecting the sound, transmitting, to a cloud-computing server system, a recording of the sound;
    obtain a determination that the detected sound meets one or more monitoring criteria; and
    in accordance with the determination that the sound meets the one or more monitoring criteria, cause a notification to be output to a mobile device, wherein the notification provides access for a user of the mobile device to the recording of the sound stored by the cloud-computing server system.

19. The non-transitory computer-readable storage medium of claim 18, wherein the notification is indicative of breaking glass and a location of the breaking glass.

20. The non-transitory computer-readable storage medium of claim 18, wherein the notification provides access to video captured using a camera corresponding to the sound.

* * * * *